(12) United States Patent
Ding et al.

(10) Patent No.: US 12,170,992 B2
(45) Date of Patent: Dec. 17, 2024

(54) DATA TRANSMISSION METHOD, APPARATUS, AND RELATED DEVICE

(71) Applicant: HUAWEI TECHNOLOGIES CO., LTD., Shenzhen (CN)

(72) Inventors: Mengying Ding, Shanghai (CN); Shuri Liao, Shanghai (CN); Peng Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 349 days.

(21) Appl. No.: 17/720,539

(22) Filed: Apr. 14, 2022

(65) Prior Publication Data

US 2022/0248415 A1 Aug. 4, 2022

Related U.S. Application Data

(63) Continuation of application No. PCT/CN2020/121359, filed on Oct. 16, 2020.

(30) Foreign Application Priority Data

Oct. 18, 2019 (CN) .......................... 201910995604.7

(51) Int. Cl.
*H04W 72/04* (2023.01)
*H04W 72/121* (2023.01)
(Continued)

(52) U.S. Cl.
CPC ..... *H04W 72/121* (2013.01); *H04W 72/1263* (2013.01); *H04W 72/23* (2023.01); *H04W 92/18* (2013.01)

(58) Field of Classification Search
CPC .......... H04W 72/121; H04W 72/1263; H04W 72/23; H04W 92/18; H04L 1/1864;
(Continued)

(56) References Cited

U.S. PATENT DOCUMENTS

2013/0148637 A1* 6/2013 Yang ..................... H04W 72/23
370/336
2019/0082459 A1 3/2019 Faurie et al.
(Continued)

FOREIGN PATENT DOCUMENTS

CN 106793092 A 5/2017
CN 108476493 A 8/2018
(Continued)

OTHER PUBLICATIONS

HUAWEI., "Overview of Rel-17 Work Areas for NR and LTE", 3GPP RAN#84; RP-191007, Jun. 3-6, 2019, 21 pages.
(Continued)

*Primary Examiner* — Maharishi V Khirodhar
(74) *Attorney, Agent, or Firm* — Maier & Maier, PLLC

(57) ABSTRACT

A data transmission method and apparatus, and a related device, and may be used in the internet of vehicles, for example, V2X, LTE-V, or V2V, or may be used in fields such as D2D, intelligent driving, and intelligent connected vehicle. A network device may send first downlink control information to a first terminal device and a second terminal device, to indicate the first terminal device and the second terminal device to perform user cooperative transmission in a first stage. After the transmission in the first stage is completed, the network device sends second downlink control information to the first terminal device and the second terminal device, to indicate the first terminal device and the second terminal device to perform user cooperative transmission in a second stage. The network device uses a two-level scheduling manner to improve transmission efficiency in the second stage.

18 Claims, 18 Drawing Sheets

(51) Int. Cl.
*H04W 72/1263* (2023.01)
*H04W 72/23* (2023.01)
*H04W 76/00* (2018.01)
*H04W 88/08* (2009.01)
*H04W 92/18* (2009.01)

(58) Field of Classification Search
CPC ... H04L 1/0045; H04L 1/0061; H04L 1/0072; H04L 2001/0092; H04L 1/0011; H04L 1/0025; H04L 1/0005
USPC .......................................................... 370/329
See application file for complete search history.

(56) References Cited

U.S. PATENT DOCUMENTS

| | | | |
|---|---|---|---|
| 2022/0007403 A1* | 1/2022 | Li | H04W 72/23 |
| 2022/0295564 A1* | 9/2022 | Cao | H04L 5/0044 |

FOREIGN PATENT DOCUMENTS

| | | |
|---|---|---|
| WO | 2017117253 A1 | 7/2017 |
| WO | 2018157673 A1 | 9/2018 |
| WO | 2019028891 A1 | 2/2019 |

OTHER PUBLICATIONS

Huawei et al., "Overview of Rel-17 work areas for NR and LTE", 3GPP TSG RAN Meeting #84; RP-191486, Jun. 3-6, 2019, 22 pages.

Huawei, HiSilicon, "Further views on Rel-17 work area on NR sidelink enhancements for V2X and other use cases". 3GPP TSG RAN Meeting #85, Newport Beach, USA, Sep. 16-20, 2019, RP-191831, 13 pages.

Huawei, HiSilicon, "Rel-17 work scope on NR sidelink enhancements for 5G V2X and other use case". 3GPP TSG RAN Meeting #84, Newport Beach, USA, Jun. 3-6, 2019, RP-191011, 12 pages.

* cited by examiner

DATA TRANSMISSION METHOD, APPARATUS, AND RELATED DEVICE

CROSS-REFERENCE TO RELATED APPLICATIONS

This application is a continuation of International Application No. PCT/CN2020/121359, filed on Oct. 16, 2020, which claims priority to Chinese Patent Application No. 201910995604.7, filed on Oct. 18, 2019. The disclosures of the aforementioned applications are hereby incorporated by reference in their entireties.

TECHNICAL FIELD

The embodiments relate to the field of communication technologies, and in particular, to a data transmission method and apparatus, and a related device.

BACKGROUND

Wireless communication technologies have undergone rapid development in the past tens of years, and have successively undergone a first generation wireless communication system based on an analog communication system, a 2G wireless communication system represented by a global system for mobile communications (GSM), a 3G wireless communication system represented by wideband code division multiple access (WCDMA), and a long term evolution (LTE) 4th generation (4G) wireless communication system that now has been widely put into commercial use in the world and has achieved great success. Services supported by the wireless communication systems also develop from initial voices and short message service messages to currently supported wireless high-speed data communication. In addition, a quantity of wireless connections worldwide is continuously increasing at a high speed, and various new wireless service types also emerge in large number, for example, the internet of things and self-driving. These impose a higher requirement on a next generation wireless communication system, namely, a 5th generation (5G) communication system.

In an evolved communication system, not only cellular communication between a terminal device and a network device is supported, but direct communication, for example, device-to-device (D2D) or vehicle-to-everything (V2X), between terminal devices is also supported. A link for the direct communication between terminal devices is generally referred to as a sidelink (SL). Sidelink transmission may be used to implement direct transmission between the terminal devices without using a base station. For example, SL transmission may be used in the internet of vehicles to implement information exchange between vehicles. In this way, the vehicles can more accurately learn of changes in an ambient environment, to implement safer driving.

User cooperation is one of features mainly supported in a next-generation communication system. An uplink transmission process based on user cooperation mainly includes two stages: In a first stage, user equipment (SUE) sends data to related cooperative user equipment (CUE) through a physical sidelink shared channel (PSSCH); and in a second stage, the SUE and the CUE both send data to a base station through a physical uplink shared channel (PUSCH). The base station may send downlink control information (DCI) to user equipment through a physical downlink control channel (PDCCH), to indicate the user equipment to perform cooperative transmission. There is no specific feasible solution for properly and effectively indicating that the user equipment should perform cooperative transmission.

SUMMARY

Embodiments provide a data transmission method and apparatus, and a related device. The data transmission method may be performed by a network device or may be performed by a chip used in a network device or another combined part having a function of the network device. That the network device performs the method is used as an example. The network device may use two independent downlink control channels (PDCCHs) to carry first downlink control information and second downlink control information respectively, to indicate a first terminal device and a second terminal device to perform transmission in a first stage and transmission in a second stage. The network device sends, by using a two-level scheduling manner, the downlink control information twice to indicate transmission at two stages, so that the network device can flexibly adjust a transmission configuration in the second stage based on a transmission status in the first stage. This helps improve transmission efficiency in the second stage.

According to a first aspect, an embodiment provides a data transmission method. The method is performed by a network device. The network device sends first downlink control information to a first terminal device and a second terminal device, where the first downlink control information includes first transmission configuration information, and the first transmission configuration information indicates a sidelink resource and/or a sidelink transmission parameter used by the first terminal device to send first data to the second terminal device. After transmission in a first stage is completed, the network device sends second downlink control information to the first terminal device and the second terminal device, where the second downlink control information includes second transmission configuration information, and the second transmission configuration information indicates an uplink resource and/or an uplink transmission parameter used by the first terminal device and/or the second terminal device to send the first data to the network device.

The network device uses a two-level scheduling manner, so that the network device can flexibly adjust a transmission configuration in a second stage based on a transmission status in the first stage. This helps improve transmission efficiency in the second stage.

The network device receives the first data from the first terminal device and/or the second terminal device. With the two-level scheduling of the network device, the first terminal device and the second terminal device can implement cooperative transmission, and send data of the first terminal device to the network device. This helps improve a data transmission success rate of the first terminal device.

The network device receives feedback information from the second terminal device. The feedback information is used to indicate whether the second terminal device correctly receives the first data. The network device may determine, by receiving the feedback information, that the transmission in the first stage is completed.

A format of the first downlink control information and a format of the second downlink control information are different. This indicates that the first downlink control information and the second downlink control information are carried on different PDCCHs.

The first downlink control information is scrambled by using a first identifier, and the second downlink control information is scrambled by using a second identifier. The first downlink control information and the second downlink control information are scrambled by using different identifiers. This helps distinguish whether received downlink control information is the first downlink control information transmitted for the first stage or the second downlink control information transmitted for the second stage.

The first downlink control information further includes first indication information, and the first indication information is used to indicate the first terminal device to send the first data to the second terminal device through a sidelink.

The second downlink control information further includes second indication information, and the second indication information is used to indicate the first terminal device and/or the second terminal device to send the first data to the network device through an uplink. For the downlink control information, an indication field may be newly added to distinguish between the first downlink control information and the second downlink control information.

The second downlink control information further includes third indication information, and the third indication information indicates a transmission mode used by the second terminal device to send the first data to the network device.

The feedback information is used to indicate that the second terminal device correctly receives the first data; and the third indication information indicates a decode-and-forward transmission mode used by the second terminal device to send the first data to the network device.

The feedback information is used to indicate that the second terminal device does not correctly receive the first data; and the third indication information indicates an amplify-and-forward transmission mode or a give-up-forwarding transmission mode used by the second terminal device to send the first data to the network device.

According to a second aspect, an embodiment provides a data transmission method. The method is performed by a first terminal device. The first terminal device may receive first downlink control information from a network device, where the first downlink control information includes first transmission configuration information, the first transmission configuration information indicates a sidelink resource and/or a sidelink transmission parameter used by the first terminal device to send first data to a second terminal device, a destination receive end of the first data is the network device, and the first terminal device and the second terminal device belong to a same cooperation group. The first terminal device sends the first data to the second terminal device. When transmission in a first stage is completed, the first terminal device receives second downlink control information from the network device, where the second downlink control information includes second transmission configuration information, the second transmission configuration information indicates an uplink resource and/or an uplink transmission parameter used by the first terminal device and/or the second terminal device to send the first data to the network device.

It can be understood that when transmission channel quality in the first stage deteriorates, transmission of the first terminal device in the first stage may fail. If transmission in a second stage continues to be performed, a transmission failure is found only after the transmission in the second stage is completed. This causes an increase in a transmission latency. By using a two-level transmission manner, the first terminal device can determine, by receiving the second downlink control information sent by the network device, that the transmission in the first stage succeeds. The transmission in the second stage is performed only when it is determined that the transmission in the first stage succeeds. This helps reduce the transmission latency.

After receiving the second downlink control information from the network device, the first terminal device may further send the first data to the network device.

The first downlink control information further includes first indication information, and the first indication information is used to indicate the first terminal device to send the first data to the second terminal device through a sidelink.

The second downlink control information further includes second indication information, and the second indication information is used to indicate the first terminal device to send the first data to the network device through an uplink. For the downlink control information, an indication field may be newly added to distinguish between the first downlink control information and the second downlink control information.

According to a third aspect, an embodiment provides a data transmission method. The method is performed by a second terminal device. The second terminal device receives first downlink control information from a network device, where the first downlink control information includes first transmission configuration information, the first transmission configuration information indicates a sidelink resource and/or a sidelink transmission parameter used by a first terminal device to send first data to the second terminal device, a destination receive end of the first data is the network device, and the first terminal device and the second terminal device belong to a same cooperation group. The second terminal device receives the first data from the first terminal device, and then sends feedback information to the network device, where the feedback information is used to indicate whether the second terminal device correctly receives the first data. After transmission in a first stage is completed, the second terminal device receives second downlink control information from the network device, where the second downlink control information includes second transmission configuration information, and the second transmission configuration information indicates an uplink resource and/or an uplink transmission parameter used by the first terminal device and/or the second terminal device to send the first data to the network device.

It can be understood that by using a two-level transmission manner, the second terminal device can determine, by receiving the second downlink control information sent by the network device, that the transmission in the first stage succeeds. The second terminal device can avoid continuing performing transmission in a second stage when the transmission in the first stage fails, thereby avoiding a waste of transmission resources.

The second downlink control information further includes third indication information, and the third indication information indicates a transmission mode used by the second terminal device to send the first data to the network device.

The feedback information is used to indicate that the second terminal device correctly receives the first data; and after receiving the second downlink control information from the network device, the second terminal device may send the first data to the network device by using a decode-and-forward transmission mode.

The feedback information is used to indicate that the second terminal device does not correctly receive the first data; and after receiving the second downlink control information from the network device, the second terminal device may send the first data to the network device by using an amplify-and-forward transmission mode; or clear the first data from a buffer by using a give-up-forwarding transmission mode.

According to a fourth aspect, an embodiment provides a data transmission apparatus. The apparatus has a function of implementing the data transmission method provided in the first aspect. The function may be implemented by hardware or may be implemented by hardware executing corresponding software. The hardware or the software includes one or more modules corresponding to the function.

According to a fifth aspect, an embodiment provides a data transmission apparatus. The apparatus has a function of implementing the data transmission method provided in the second aspect. The function may be implemented by hardware or may be implemented by hardware executing corresponding software. The hardware or the software includes one or more modules corresponding to the function.

According to a sixth aspect, an embodiment provides a data transmission apparatus. The apparatus has a function of implementing the data transmission method provided in the third aspect. The function may be implemented by hardware or may be implemented by hardware executing corresponding software. The hardware or the software includes one or more modules corresponding to the function.

According to a seventh aspect, an embodiment provides a data transmission apparatus. The apparatus includes a processor and a memory. The memory is configured to store a computer program, and the processor executes the computer program stored in the memory, so that the apparatus performs the method in any one of the first aspect or the possible implementations of the first aspect.

According to an eighth aspect, an embodiment provides a data transmission apparatus. The apparatus includes a processor and a memory. The memory is configured to store a computer program, and the processor executes the computer program stored in the memory, so that the apparatus performs the method in any one of the second aspect or the possible implementations of the second aspect.

According to a ninth aspect, an embodiment provides a data transmission apparatus. The apparatus includes a processor and a memory. The memory is configured to store a computer program, and the processor executes the computer program stored in the memory, so that the apparatus performs the method in any one of the third aspect or the possible implementations of the third aspect.

According to a tenth aspect, an embodiment provides a communication system. The communication system includes the data transmission apparatus provided in the seventh aspect, the data transmission apparatus provided in the eighth aspect, and the data transmission apparatus provided in the ninth aspect.

According to an eleventh aspect, an embodiment provides a communication system. The communication system includes the data transmission apparatus provided in the eighth aspect and the data transmission apparatus provided in the ninth aspect.

According to a twelfth aspect, an embodiment provides a computer-readable storage medium. The computer-readable storage medium includes a program or instructions. When the program is run or the instructions are run on a computer, the computer is enabled to perform the method in any one of the first aspect or the possible implementations of the first aspect.

According to a thirteenth aspect, an embodiment provides a computer-readable storage medium. The computer-readable storage medium includes a program or instructions. When the program is run or the instructions are run on a computer, the computer is enabled to perform the method in any one of the second aspect or the possible implementations of the second aspect.

According to a fourteenth aspect, an embodiment provides a computer-readable storage medium. The computer-readable storage medium includes a program or instructions. When the program is run or the instructions are run on a computer, the computer is enabled to perform the method in any one of the third aspect or the possible implementations of the third aspect.

According to a fifteenth aspect, an embodiment provides a communication apparatus. The communication apparatus includes a processor. For example, the processor is used in a data transmission apparatus, and is configured to implement the function or method in the first aspect. The communication apparatus may be, for example, a chip system. In a feasible implementation, the communication apparatus further includes a memory. The memory is configured to store program instructions and data that are necessary for implementing the function of the method in the first aspect.

According to a sixteenth aspect, an embodiment provides a communication apparatus. The communication apparatus includes a processor. For example, the processor is used in a data transmission apparatus, and is configured to implement the function or method in the second aspect. The communication apparatus may be, for example, a chip system. In a feasible implementation, the communication apparatus further includes a memory. The memory is configured to store program instructions and data that are necessary for implementing the function of the method in the second aspect.

According to a seventeenth aspect, an embodiment provides a communication apparatus. The communication apparatus includes a processor. For example, the processor is used in a data transmission apparatus, and is configured to implement the function or method in the third aspect. The communication apparatus may be, for example, a chip system. In a feasible implementation, the chip system further includes a memory. The memory is configured to store program instructions and data that are necessary for implementing the function of the method in the third aspect.

The chip system in the foregoing aspects may be a system on chip (SOC), may be a baseband chip, or the like. The baseband chip may include a processor, a channel encoder, a digital signal processor, a modem, an interface module, or the like.

BRIEF DESCRIPTION OF DRAWINGS

To describe solutions of the embodiments more clearly, the following briefly describes the accompanying drawings.

DETAILED DESCRIPTION OF THE EMBODIMENTS

The following describes solutions of the embodiments with reference to the accompanying drawings.

Before the embodiments are described, related background technologies are first described.

Embodiments may be used in various types of communication systems, for example, a long term evolution (LTE) system, a future 5th generation 5G) system such as a new generation radio access technology (NR) system, and a future communication system such as a 6G system; or may be used in a future UE-centric network; or may be used in, for example, a vehicle to everything (V2X) system, a cellular technology-based internet of vehicles (LTE-V) system, and a vehicle to vehicle (V2V) system, an internet of vehicles (IoV), a machine type communication (MTC) system, a cellular technology-based internet of things (LTE-M) system, a machine to machine (M2M) system, an internet of things (IoT), and the like.

Figure 1:
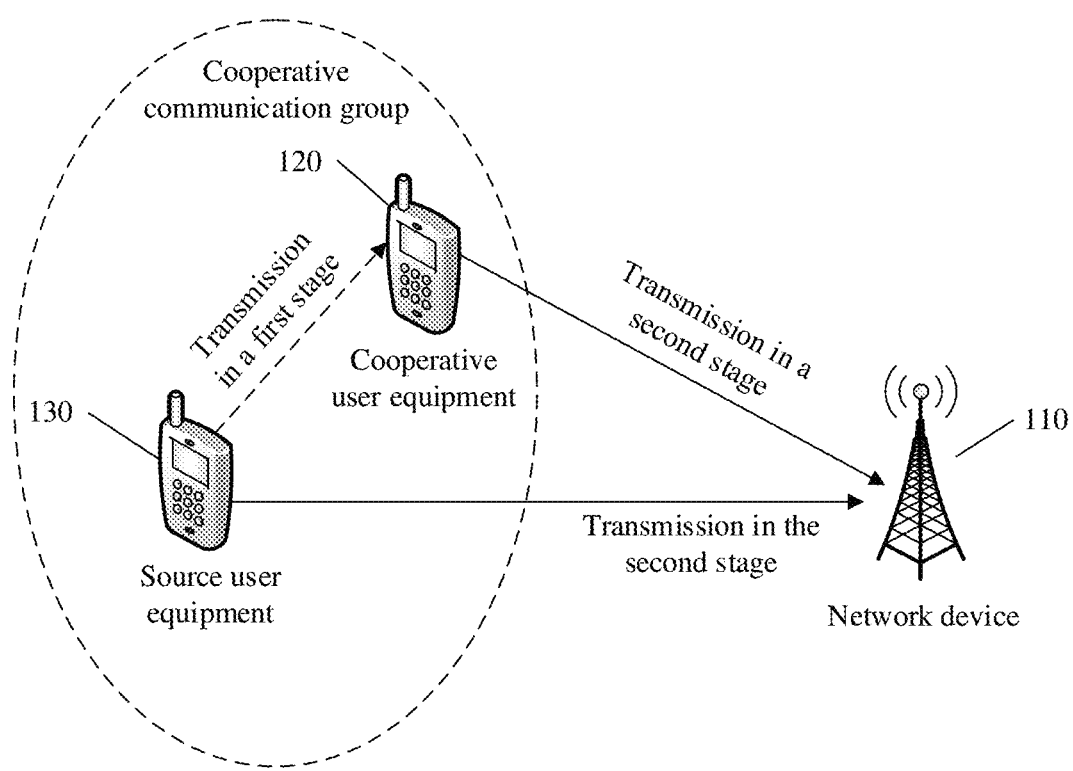
FIG. 1 is a schematic diagram of a communication system according to an embodiment.

Cooperative communication is one of features supported in a next-generation communication system. When the cooperative communication is used, a capacity of a communication system and network coverage can be significantly increased, and load of a base station can also be reduced. An application scenario of uplink cooperative communication is shown in FIG. 1. The scenario may include a network device 110, cooperative user equipment 120 (CUE), and source user equipment 130 (SUE). The application scenario of the uplink cooperative communication may include one or more SUEs and may include one or more CUEs. This is not limited.

When the SUE and the CUE perform cooperative communication, the SUE and the CUE constitute a cooperation user group. For example, SUE and CUE shown in FIG. 1 constitute a cooperation user group. Correspondingly, when there are both a plurality of SUEs and a plurality of CUEs, a plurality of cooperation user groups may be constituted. One cooperation user group corresponds to one unique identifier, for example, a user-equipment cell radio network temporary identifier (UC-RNTI), configured by the network device.

In a cell, when there is a plurality of different cooperation user groups, the cooperation user groups may be distinguished between by using different cooperation user group identifiers. For example, a cooperation group identifier of a first cooperation user group may be a UC-RNTI 1, and a cooperation group identifier of a second cooperation user group may be a UC-RNTI 2. It may be understood that, in an uplink cooperative communication scenario shown in FIG. 1, when the CUE does not send uplink data, the CUE may cooperate with the SUE to send uplink data of the SUE. In this way, when the uplink data of the SUE is sent, transmit power and spectrum resources of the CUE are obtained. Therefore, uplink transmission performance of the SUE is improved.

An uplink transmission process based on user cooperation includes two stages. In a first stage, the SUE may send data to the CUE through a physical sidelink shared channel (PSSCH). For example, the SUE may send the data to the CUE shown in FIG. 1. The SUE may send the data to the CUE by using a sidelink (SL). SL transmission is a special communication mechanism between terminal devices and can implement direct transmission between terminal devices without using a base station.

When the SUE sends data to the CUE, different forwarding manners may be used, for example, manners such as amplify-and-forward, decode-and-forward, and compress-and-forward. Amplify-and-forward indicates that a forwarding node does not decode and directly forwards received data. For example, for the CUE in FIG. 1, the CUE receives a PSSCH sent by the SUE, where the PSSCH carries data 1. The CUE does not demodulate or decode the PSSCH, and directly forwards the PSSCH to a base station through a PUSCH.

Decode-and-forward indicates that the forwarding node may perform operations such as decoding, re-encoding, modulation, and forwarding on the received data. For example, for the CUE in FIG. 1, the CUE receives a PSSCH sent by the SUE, where the PSSCH carries data 1. The CUE may decode the PSSCH to obtain original bits of the data 1, and then the CUE re-encodes and re-modulates the original bits and sends the original bits to a network device through the PUSCH.

In a second stage, the SUE and the CUE may both send data to the network device through the physical uplink shared channel (PUSCH). The SUE sends data 2 to the network device, and the CUE sends the data 1 received in the first stage to the network device. Because both the SUE and the CUE send data of the SUE to the base station, an uplink transmission capability of the SUE is improved, and an uplink transmission rate of the SUE is increased.

In the second stage, the data 2 sent by the SUE to the network device may be the same as the data 1 sent by the SUE to the CUE in the first stage or may be different from the data 1 sent by the SUE to the CUE in the first stage. The data 1 and/or the data 2 represent/represents various types of data for transmission, and may include one or more original information bits, one or more information bits, and one or more complex symbols. This is not limited in this embodiment. According to the foregoing transmission in the first stage and transmission in the second stage that are of the user cooperative uplink transmission, reliable data transmission of the data sent by the SUE can be implemented in cooperation with the CUE, and uplink coverage of the network device and transmission efficiency of the communication system are also improved.

The network device may be any device with a radio transceiver function and provides a wireless communication service for a terminal device within coverage. The network device may include but is not limited to: an evolved NodeB (eNB) in a long term evolution (LTE) system, a base station (gNB) or a transmission reception point (TRP) in a new radio access technology (NR), a subsequent evolved base station in 3GPP, an access node in a Wi-Fi system, a wireless relay node, a wireless backhaul node, and the like. The base station may be a macro base station, a micro base station, a picocell base station, a small cell, a relay station, a balloon station, or the like. A plurality of base stations may support networks of a same technology mentioned above or may support networks of different technologies mentioned above. The base station may include one or more co-site or non-co-site TRPs. The network device may alternatively be a radio controller, a centralized unit (CU), and/or a distributed unit (DU) in a cloud radio access network (CRAN) scenario. The network device may alternatively be a server, a wearable device, a vehicle-mounted device, or the like. An example in which the network device is a base station is used for description below. The plurality of network devices may be base stations of a same type or base stations of different types. The base station may communicate with a terminal device or may communicate with a terminal device through a relay station. The terminal device may communicate with a plurality of base stations using different technologies. For example, the terminal device may communicate with a base station supporting an LTE network, may communicate with a base station supporting a 5G network, and may further support a dual connection to a base station in an LTE network and a base station in a 5G network.

The SUE may be a terminal device. The terminal device may be a device having a wireless transceiver function, and may be deployed on land, including an indoor device or an outdoor device, a handheld device, a wearable device, or a vehicle-mounted device, may be deployed on water (for example, on a ship), or may be deployed in the air (for example, on an airplane, a balloon, or a satellite). The terminal device may be a mobile phone, a tablet computer (Pad), a computer with a wireless transceiver function, a virtual reality (VR) terminal device, an augmented reality (AR) terminal device, a wireless terminal in industrial control, a vehicle-mounted terminal device, a wireless terminal in self-driving, a wireless terminal in telemedicine, a wireless terminal in a smart grid, a wireless terminal in transportation safety, a wireless terminal in a smart city, a wireless terminal in a smart home, a wearable terminal device, or the like. Application scenarios are not limited in embodiments. The terminal device may alternatively be referred to as user equipment (UE), an access terminal device, a vehicle-mounted terminal, an industrial control terminal, a UE unit, a UE station, a mobile station, a remote station, a remote terminal device, a mobile device, a UE terminal device, a terminal device, a wireless communication device, a UE agent, a UE apparatus, or the like. The terminal may alternatively be fixed or mobile. The terminal device may alternatively be a vehicle-mounted module, a vehicle-mounted module, a vehicle-mounted component, a vehicle-mounted chip, or a vehicle-mounted unit that is built in a vehicle as one or more components or units. The vehicle uses the vehicle-mounted module, the vehicle-mounted module, the vehicle-mounted component, the vehicle-mounted chip, or the vehicle-mounted unit that is built in the vehicle, to implement a method.

The CUE may be the foregoing network device or may be the foregoing terminal device. For details, refer to descriptions in the foregoing embodiment. Details are not described herein again.

The network device may indicate, to UE through a control channel, related information about scheduled data transmission. For example, the network device may indicate downlink control information (DCI) to the UE through a physical downlink control channel (PDCCH). The DCI includes information about scheduled downlink transmission (for example, a time-frequency resource, a modulation and coding scheme, and precoding information of the downlink transmission), and the UE may receive the downlink transmission based on the related information. In addition, the network device adds cyclic redundancy check (CRC) bits after DCI bits, so that when receiving the PDCCH, the UE can determine, based on the CRC bits obtained in a decoding process, whether the corresponding PDCCH is correctly decoded. For example, the network device may scramble the CRC bits by using a cell radio network temporary identifier (C-RNTI). In a process in which the UE performs decoding after receiving the PDCCH, the UE may determine whether the PDCCH is a to-be-received PDCCH by checking the CRC bits by using the C-RNTI. If the check succeeds, the UE successfully decodes the received PDCCH, and may receive a corresponding physical downlink shared channel (PDSCH) based on DCI indication information carried on the PDCCH. If the check fails, the UE fails in decoding the received PDCCH.

Similarly, for sidelink transmission, the SUE sends a physical sidelink control channel (PSCCH) and a physical sidelink shared channel (PSSCH) to the CUE. The PSCCH carries sidelink control information (SCI), and the SCI includes parameter information (for example, a time-frequency resource, a modulation and coding scheme, and precoding information of the sidelink transmission) related to the PSSCH. The CUE may receive the corresponding PSSCH based on SCI indication information.

In a user cooperative transmission process, the network device may send PDCCH transmission control information to the SUE and/or the CUE to indicate the SUE and/or the CUE to perform PUSCH and/or PSSCH transmission in the user cooperative transmission process. However, in existing user cooperative transmission, a user cannot determine, based on a received PDCCH, a currently used transmission mode, that is, cannot determine whether the DCI indicated by using the PDCCH is used to indicate PUSCH transmission or PSSCH transmission. This may reduce transmission reliability.

To resolve the foregoing problem, an embodiment provides a data transmission method. In the method, a network device may send first downlink control information to SUE and CUE, to indicate the SUE and the CUE to perform user cooperative transmission in a first stage. The first downlink control information includes first transmission configuration information, and the first transmission configuration information indicates a sidelink resource and/or a sidelink transmission parameter used by the SUE to send first data to the CUE. The network device may further send second downlink control information to the SUE and the CUE, to indicate the SUE and the CUE to perform user cooperative transmission in a second stage. The second downlink control information includes second transmission configuration information, and the second transmission configuration information indicates an uplink resource and/or an uplink transmission parameter used by the SUE and/or the CUE to send the first data to the network device. The network device, by using two-level scheduling, can update a transmission configuration in the second stage more flexibly based on a data transmission status in the first stage. This helps improve transmission reliability of the SUE and the CUE and helps improve transmission efficiency in the second stage.

The following provides descriptions with reference to embodiments. In each embodiment, an example in which a first terminal device is the SUE and a second terminal device is the CUE is used for description.

Figure 2:
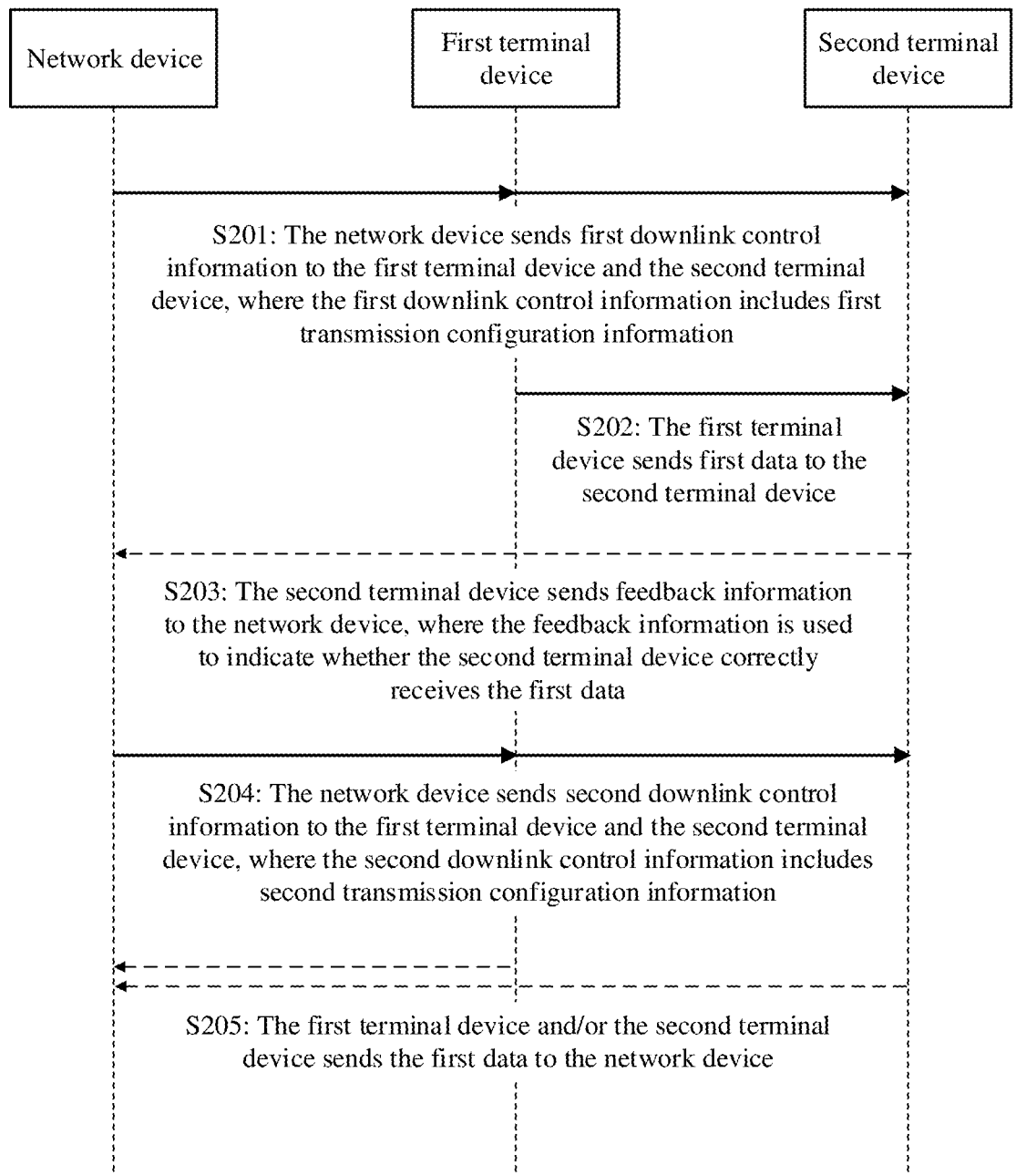
FIG. 2 is a schematic flowchart of a data transmission method according to an embodiment.

An embodiment provides a data transmission method. Refer to FIG. 2. The data transmission method includes a first stage of user cooperation and a second stage of user cooperation. The data transmission method may be implemented through interaction between a network device, a first terminal device, and a second terminal device, and includes the following steps.

S201: The network device sends first downlink control information to the first terminal device and the second terminal device, where the first downlink control information includes first transmission configuration information; and correspondingly, the first terminal device and the second terminal device receive the first downlink control information from the network device.

In the two stages of user cooperative uplink transmission, the network device may send a first stage transmission configuration and a second stage transmission configuration to the first terminal device and the second terminal device respectively by using two independent PDCCHs in the first stage and the second stage of user cooperation. Downlink control information carried on the PDCCHs includes transmission configuration information. Correspondingly, the first terminal device and the second terminal device need to determine, based on the received PDCCH, whether the current received PDCCH is a PDCCH 1 with the first stage transmission configuration or a PDCCH 2 with the second stage transmission configuration. The PDCCH 1 with the first stage transmission configuration and the PDCCH 2 with the second stage transmission configuration may be distinguished between in an explicit indication or implicit indication manner.

Optionally, the PDCCH 1 with the first stage transmission configuration and the PDCCH 2 with the second stage transmission configuration may be distinguished between in the explicit indication manner. The network device may add indication information to the downlink control information, where the indication information is used to indicate whether control signaling in the DCI carried on the current PDCCH is used for PSSCH transmission in the first stage or PUSCH transmission in the second stage.

Figure 3A:
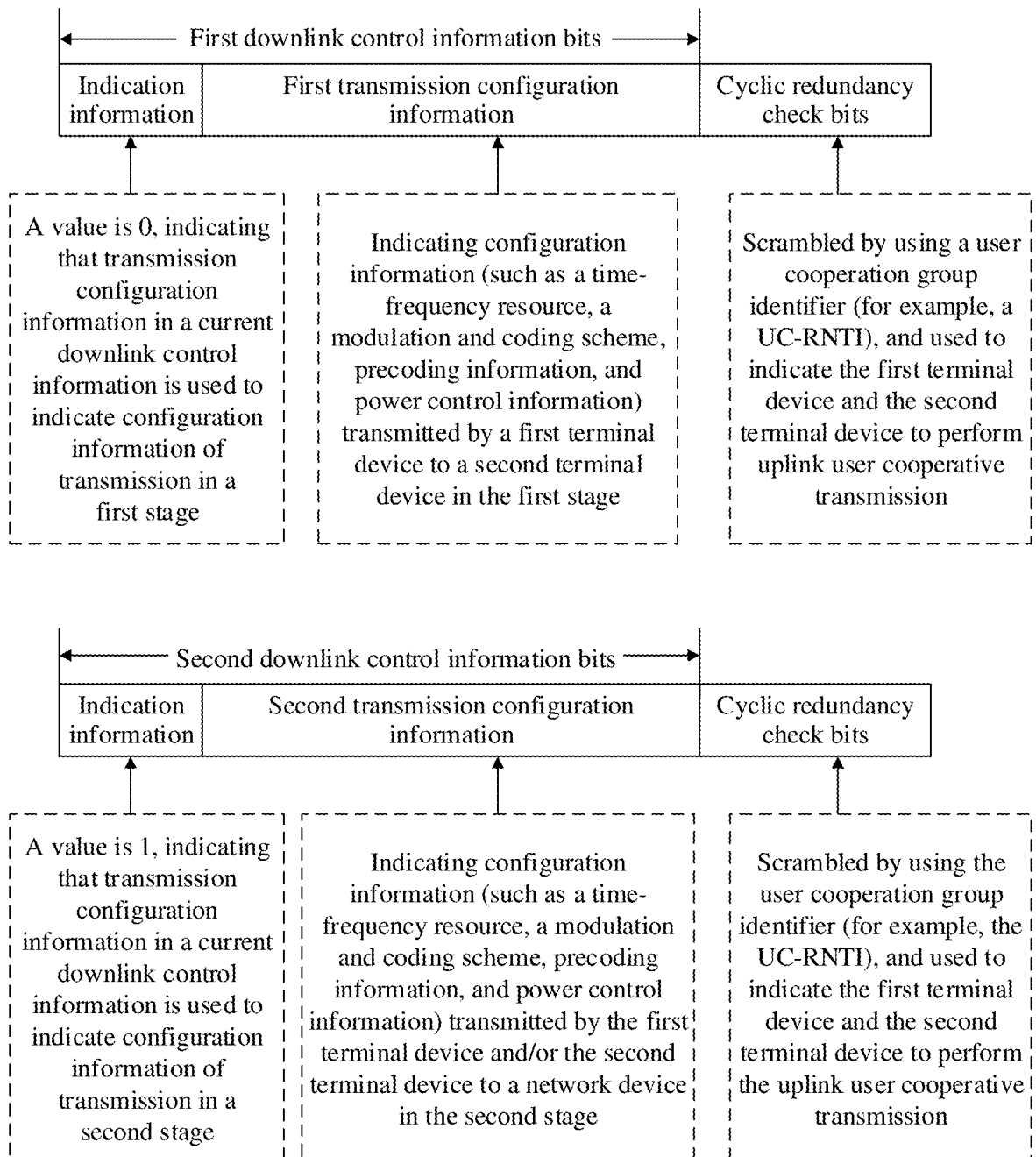
FIG. 3a is a schematic diagram of downlink control information using an explicit indication according to an embodiment.

Refer to FIG. 3a. Indication information is added to downlink control information shown in FIG. 3a. The indication information may occupy one or more bits to indicate that a current PDCCH is used for PSSCH transmission in the first stage or PUSCH transmission in the second stage. For example, when the indication information occupies one bit for indication, if a value is 0, it indicates that the control signaling in the DCI carried on the current PDCCH is used for the PSSCH transmission in the first stage; if a value is 1, it indicates that the control signaling in the DCI carried on the current PDCCH is used for the PUSCH transmission in the second stage.

Correspondingly, the first terminal device and the second terminal device receive the PDCCH from the network device and obtain the indication information in the DCI carried on the PDCCH. If the value of the indication information is 0, it indicates that the currently received downlink control information is first downlink control information, the first downlink control information includes first indication information, transmission configuration information in the first downlink control information is first transmission configuration information, and the first transmission configuration information indicates a sidelink resource (for example, a time-frequency resource used for transmission in the first stage) and/or a sidelink transmission parameter (for example, a modulation and coding scheme, precoding information, and power control information that are used for the transmission in the first stage) used by the first terminal device to send first data to the second terminal device in the first stage.

If the value of the indication information is 1, it indicates that the currently received downlink control information is second downlink control information, the second downlink control information includes second indication information, transmission configuration information in the second downlink control information is second transmission configuration information, and the second transmission configuration information indicates an uplink resource (for example, a time-frequency resource used for transmission in the second stage) and/or an uplink transmission parameter (for example, a modulation and coding scheme, precoding information, and power control information that are used for the transmission in the second stage) used by the first terminal device and/or the second terminal device to send data to the network device in the second stage.

It may be understood that the value of the indication information is only used to distinguish whether the currently received downlink control information is the first downlink control information or the second downlink control information. A specific type of downlink control information to which a specific value corresponds is not limited in this embodiment. CRC bits may be scrambled by using a cooperation user group identifier (for example, a UC-RNTI), and the CRC bits scrambled by using the cooperation user group identifier is used to indicate the first terminal device and the second terminal device to perform user cooperative uplink transmission.

Figure 3B:
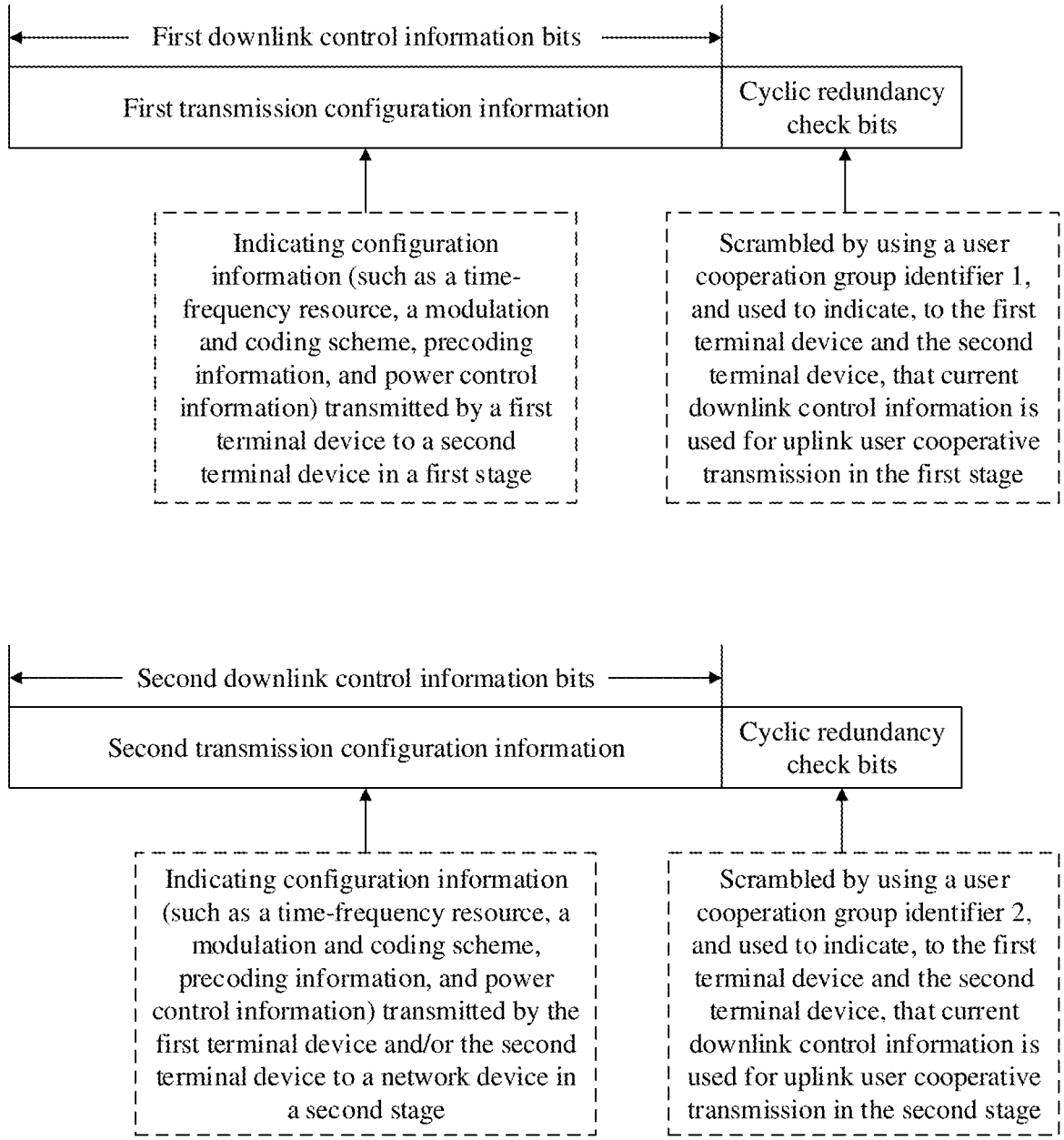
FIG. 3b is a schematic diagram of downlink control information using an implicit indication according to an embodiment.

Optionally, the PDCCH 1 with the first stage transmission configuration and the PDCCH 2 with the second stage transmission configuration may be distinguished between in an implicit indication manner. Refer to FIG. 3b. User cooperation groups may correspond to two identifiers: a UC-RNTI 1 and a UC-RNTI 2. The network device may scramble, by using the UC-RNTI 1, CRC bits of DCI carried on the PDCCH 1. Scrambled control signaling in the DCI carried on the PDCCH 1 is used for PSSCH transmission in the first stage. The network device may scramble, by using the UC-RNTI 2, CRC bits of DCI carried on the PDCCH 2. Scrambled control signaling in the DCI carried on the PDCCH 2 is used for PUSCH transmission in the second stage.

Correspondingly, the first terminal device and the second terminal device receive the PDCCH from the network device by using the UC-RNTI 1. If the PDCCH can be correctly decoded, the first terminal device and the second terminal device can determine that currently received downlink control information is first downlink control information, and transmission configuration information in the current DCI is first transmission configuration information; and the first terminal device and the second terminal device can perform PSSCH transmission based on a time-frequency resource, a modulation and coding scheme, precoding information, power control information, and the like that are indicated by the first transmission configuration information.

The first terminal device and the second terminal device receive the PDCCH from the network device by using the UC-RNTI 2. If the PDCCH can be correctly decoded, the first terminal device and the second terminal device can determine that currently received downlink control information is second downlink control information, and transmission configuration information in the current DCI is second transmission configuration information; and the first terminal device and the second terminal device can perform PUSCH transmission based on a time-frequency resource, a modulation and coding scheme, precoding information, power control information, and the like that are indicated by the second transmission configuration information.

S202: The first terminal device sends first data to the second terminal device; and correspondingly, the second terminal device receives the first data from the first terminal device.

The first terminal device receives the PDCCH 1 from the network device, and determines, based on the time-frequency resource, the modulation and coding scheme, the precoding information, and the like that are used for PSSCH transmission and that are indicated by the first transmission configuration information in the DCI carried on the PDCCH 1, a resource used to send the first data to the second terminal device. For example, the first terminal device transmits the PSSCH on a time domain resource 1 and a frequency domain resource 1 that are indicated by the first transmission configuration information, and the second terminal device may determine, by receiving the PDCCH 1, the time domain resource 1 and the frequency domain resource 1 for transmitting the PSSCH. In this way, receiving of the first data is completed.

Optionally, in user cooperative uplink transmission in the first stage, the first terminal device may indicate, to the second terminal device by using a PSCCH, a time-frequency resource, a modulation and coding scheme, precoding information, and the like that are used for PSSCH transmission. However, in this embodiment, because the network device may indicate, to the first terminal device and the second terminal device by using the PDCCH 1, the time-frequency resource, the modulation and coding scheme, the precoding information, and the like that are used for PSSCH transmission, the first terminal device does not need to transmit the PSCCH to the second terminal device. In this way, a time-frequency resource originally used to transmit the PSCCH may be reconfigured by the network device, or the time-frequency resource originally used to transmit the PSCCH may be configured by the base station by using the PDCCH 1 or RRC signaling.

Figure 4A:
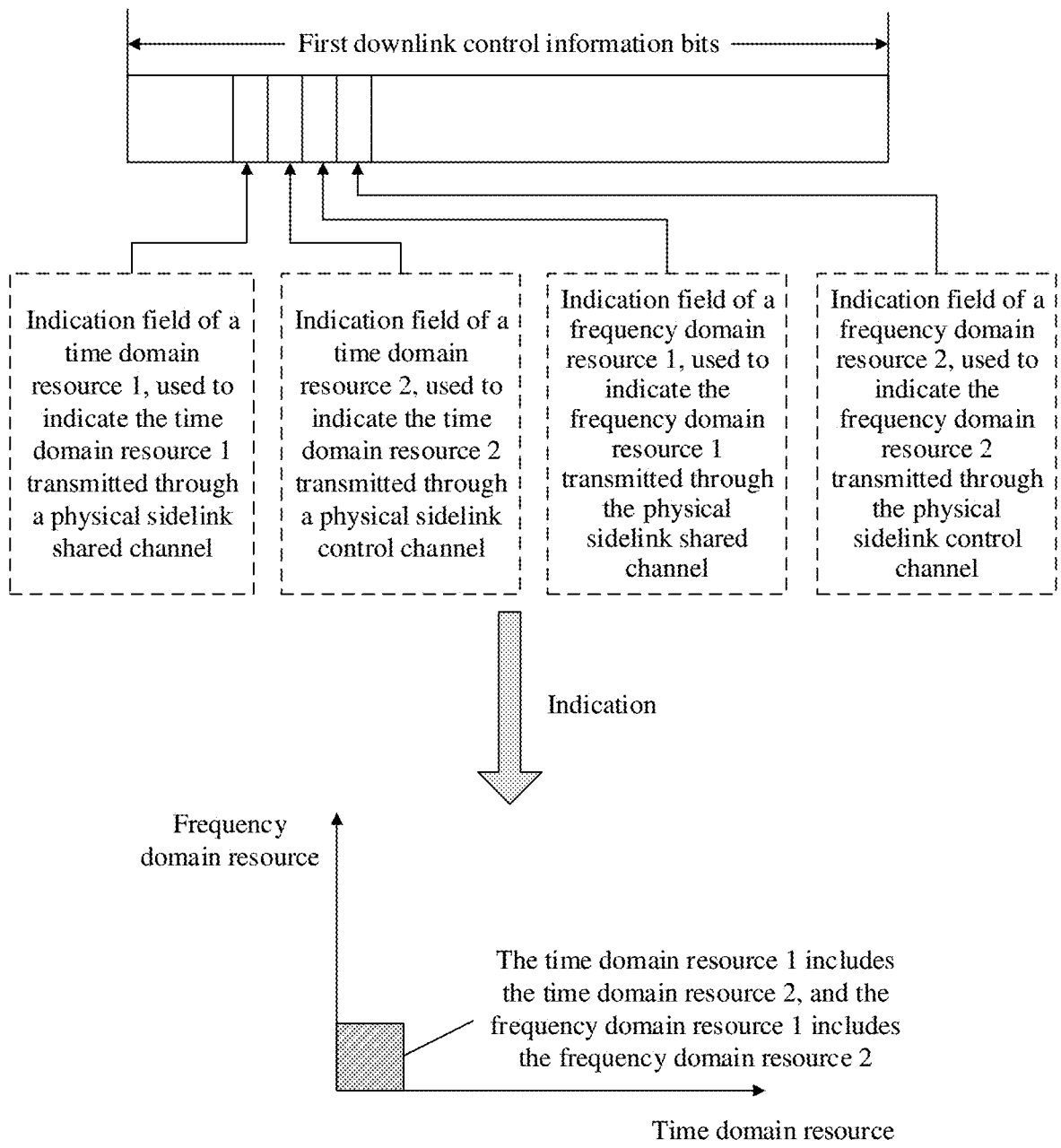
FIG. 4a is a schematic diagram in which first transmission configuration information indicates a time-frequency resource used by a first terminal device to perform transmission in a first stage according to an embodiment.

For example, in a possible case, the DCI or RRC signaling carried on the PDCCH 1 includes an indication field used to indicate a time domain resource 2 and a frequency domain resource 2 that are used for PSCCH transmission. The time domain resource 1 includes a time domain resource 2 originally used to transmit the PSCCH, and the frequency domain resource 1 includes a frequency domain resource 2 originally used to transmit the PSCCH, as shown in FIG. 4a. The first terminal device may perform PSSCH transmission on a new time domain resource 1 and a new frequency domain resource 1. Bit scrambling is performed on the PSSCH by using the cooperation user group identifier. In a process of generating the PSSCH, coded bits are rearranged, and then, modulation is performed on the scrambled bits. Correspondingly, the second terminal device receives the PSSCH, and performs bit descrambling on the PSSCH by using the cooperation user group identifier, to obtain the first data carried on the PSSCH.

Figure 4B:
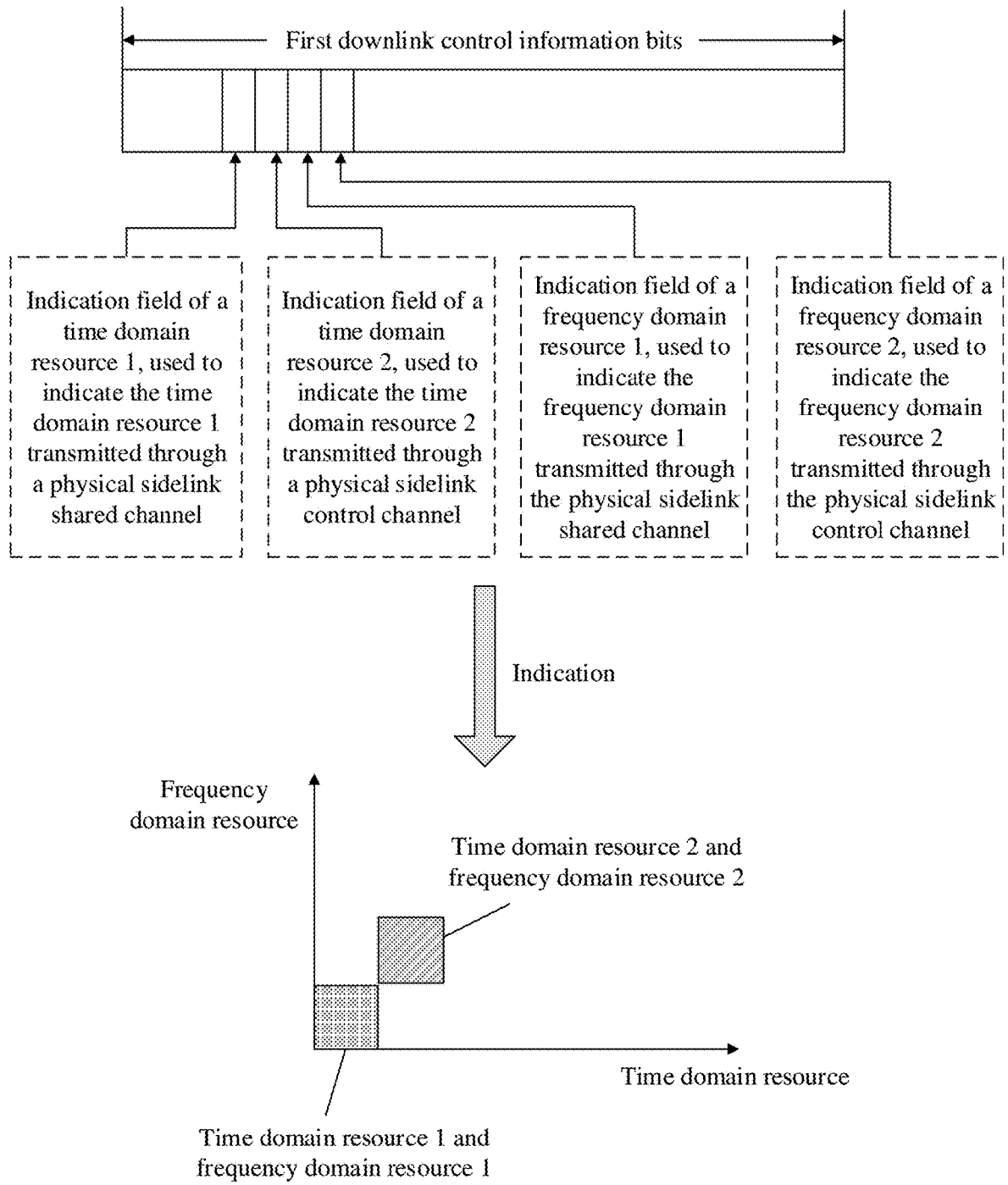
FIG. 4b is a schematic diagram in which first transmission configuration information indicates another time-frequency resource used by a first terminal device to perform transmission in a first stage according to an embodiment.

In another possible case, the DCI or RRC signaling carried on the PDCCH 1 includes an indication field used to indicate a time domain resource 2 and a frequency domain resource 2 that are used for PSCCH transmission. The time domain resource 1 and the time domain resource 2 do not overlap, and the frequency domain resource 1 and the frequency domain resource 2 do not overlap, as shown in FIG. 4b. Therefore, the first terminal device may transmit the PSSCH on the time domain resource 1, the frequency domain resource 1, the time domain resource 2, and the frequency domain resource 2. The PSSCH transmission is scrambled by using the cooperation user group identifier. In this case, the first terminal device may transmit the first data on the time domain resource 1 and the time domain resource 2. Correspondingly, the second terminal device receives the PSSCH, and performs bit descrambling on the PSSCH by using the cooperation user group identifier, to obtain the first data carried on the PSSCH.

When the DCI or RRC signaling carried on the PDCCH 1 indicates a time-frequency resource, a modulation and coding scheme, precoding information, or power control information used for PSSCH or PSCCH transmission, an indication field may be used to indicate corresponding information. In other words, one or more bits in the DCI or RRC signaling are occupied to indicate the corresponding information. For example, an indication field of the time domain resource 2 in FIG. 4b may occupy one bit in the DCI and is used to indicate the time domain resource 2 used for PSSCH transmission. It may be understood that the foregoing example is merely an example for description and does not constitute a limitation.

In another possible case, the DCI or RRC signaling carried on the PDCCH 1 includes indication fields used to indicate a time domain resource 2 and a frequency domain resource 2 that are used for PSCCH transmission. Assigning fixed values to an indication field 1 originally used to indicate the time domain resource 2 and an indication field 2 originally used to indicate the frequency domain resource 2 indicates that the indication field 1 and the indication field 2 are invalid. For example, if the indication field 1 includes 5 bits, assigned values 00000 or 11111 indicate that the indication field 1 is invalid. Therefore, the first terminal device may transmit the PSSCH on the time domain resource 1 and the frequency domain resource 1. The PSSCH transmission is scrambled by using the cooperation user group identifier. In this case, the first terminal device may transmit the first data on the time domain resource 1 and the time domain resource 2. Correspondingly, the second terminal device receives the PSSCH, and performs bit descrambling on the PSSCH by using the cooperation user group identifier, to obtain the first data carried on the PSSCH.

According to the foregoing three methods, a user can reuse the time-frequency resources that should have been configured for the PSCCH, so that system spectral efficiency is improved. In another possible case, the DCI or RRC signaling carried on the PDCCH 1 does not include the time domain resource 2 and the frequency domain resource 2 that are used for PSCCH transmission, that is, includes only the time domain resource 1 and the frequency domain resource 1 that are used for PSSCH transmission. According to the foregoing method, a quantity of bits included in the DCI carried on the PDCCH 1 is reduced.

Optionally, after the first terminal device sends the first data to the second terminal device, and the second terminal device receives the first data from the first terminal device, S203 may further be performed.

S203: The second terminal device sends feedback information to the network device, where the feedback information is used to indicate whether the second terminal device correctly receives the first data; and correspondingly, the network device receives the feedback information from the second terminal device.

After receiving the first data from the first terminal device, the second terminal device may send the feedback information to the network device to indicate whether the transmission in the first stage succeeds. The feedback information may include but is not limited to acknowledgement information (ACK) and non-acknowledgement information (NACK).

In a feasible implementation, the feedback information received by the network device from the second terminal device is the acknowledgement information, and the acknowledgement information is used to indicate that the second terminal device successfully receives the first data on the PSSCH and successfully decodes the first data in the transmission in the first stage. After receiving the acknowledgement information, the network device needs to notify the first terminal device and the second terminal device to enter transmission in the second stage.

In another feasible implementation, the feedback information received by the network device from the second terminal device is the non-acknowledgement information, and the non-acknowledgement information is used to indicate that the second terminal device fails in decoding the first data carried on the PSSCH in the transmission in the first stage. When the network device receives the non-acknowledgement information, and a quantity of times that the first terminal device transmits the first data to the second terminal device does not reach a maximum quantity of retransmission times, the network device needs to notify the first terminal device to retransmit the first data to the second terminal device. When the network device receives the non-acknowledgement information, and a quantity of times that the first terminal device transmits the first data to the second terminal device reaches a maximum quantity of retransmission times, the network device needs to notify the first terminal device and the second terminal device to enter transmission in the second stage.

S204: The network device sends second downlink control information to the first terminal device and the second terminal device, where the second downlink control information includes second transmission configuration information; and correspondingly, the first terminal device and the second terminal device receive the second downlink control information from the network device.

The network device may send the second downlink control information to the first terminal device and the second terminal device to notify the first terminal device and the second terminal device to enter the transmission in the second stage. The network device sends the second stage transmission configuration to the first terminal device and the second terminal device by using the PDCCH 2 different from the PDCCH 1 in the first stage. The PDCCH 1 with the first stage transmission configuration and the PDCCH 2 with the second stage transmission configuration may be distinguished between in an explicit indication or implicit indication manner. For a distinguishing manner, refer to the descriptions of distinguishing between the PDCCH 1 with the first stage transmission configuration and the PDCCH 2 with the second stage transmission configuration in the explicit indication or implicit indication manner in S201. Details are not described herein again.

The network device may send the PDCCH 2 to the first terminal device and the second terminal device, where the PDCCH 2 carries the second downlink control information. The second downlink control information includes the second transmission configuration information, and the second transmission configuration information indicates an uplink resource (for example, a time-frequency resource) and/or an uplink transmission parameter (for example, a modulation and coding scheme, precoding information, and power control information) used by the first terminal device and/or the second terminal device to send data to the network device in the second stage. DCI carried on the PDCCH 2 includes information such as a time domain resource 3, a frequency domain resource 3, and a modulation and coding scheme that are used by the first terminal device to transmit the PUSCH, and further includes information such as a time domain resource 4, a frequency domain resource 4, and a modulation and coding scheme that are used by the second terminal device to transmit the PUSCH.

Figure 5A:
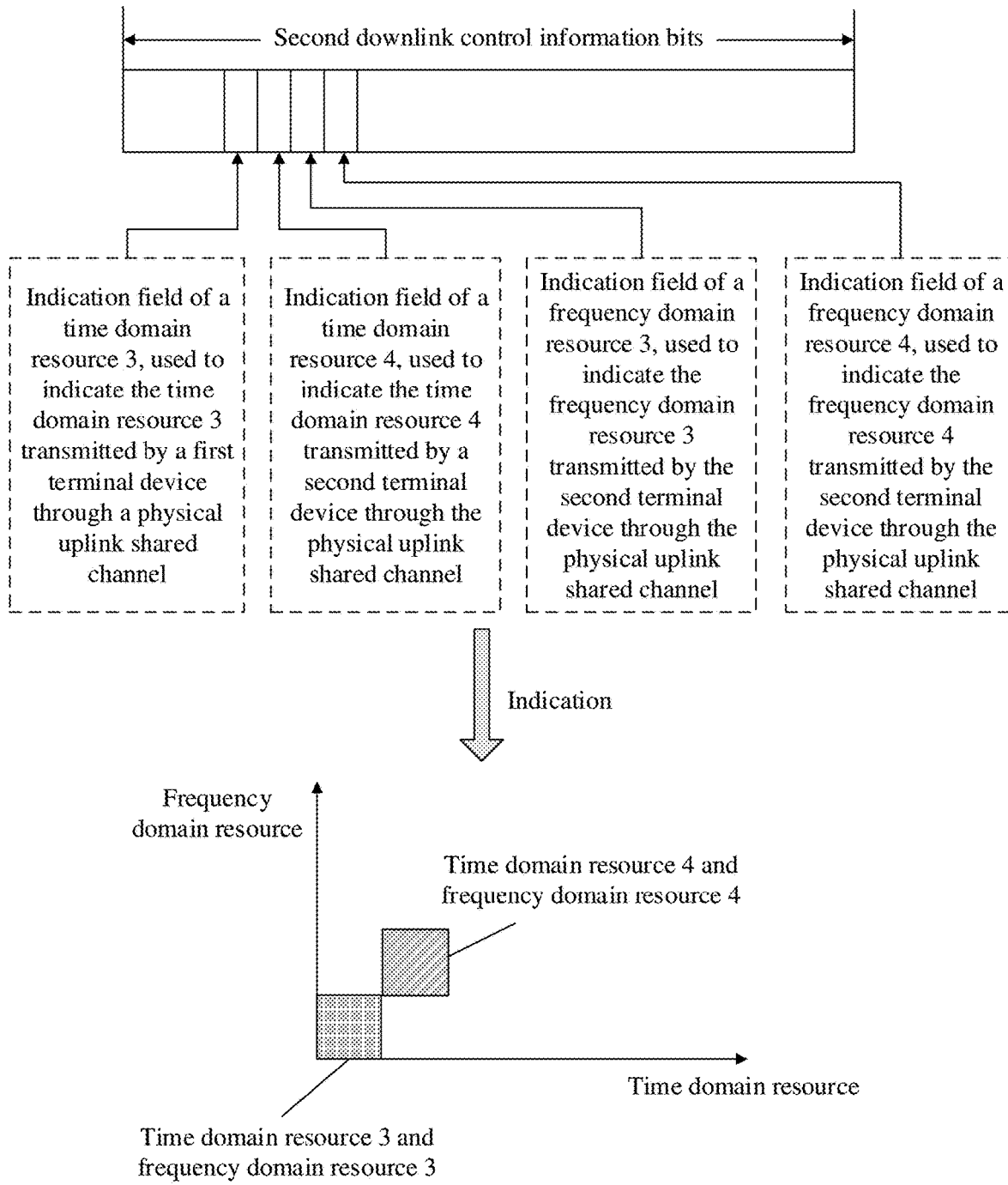
FIG. 5a is a schematic diagram of a resource configuration of user cooperative transmission in a second stage according to an embodiment.

For example, in a possible case, the DCI or RRC signaling carried on the PDCCH 2 includes indication fields used to indicate the time domain resource 3 and the frequency domain resource 3 that are used by the first terminal device for PUSCH transmission, and includes indication fields used to indicate the time domain resource 4 and the frequency domain resource 4 that are used by the second terminal device for PUSCH transmission, as shown in FIG. 5a. In the example shown in FIG. 5a, the time domain resource 3 is different from the time domain resource 4, and the frequency domain resource 3 is different from the frequency domain resource 4. The foregoing resource allocation manner is merely an example and does not constitute a limitation. It should be noted that the indication fields of the resources in the foregoing example are merely a part of examples, and the DCI or RRC signaling carried on the PDCCH 2 further includes an indication field used to indicate the modulation and coding scheme, an indication field of the precoding information, an indication field of the power control information, and the like that are of the PUSCH transmission. This is not limited in this embodiment.

Optionally, after the network device sends the second downlink control information to the first terminal device and the second terminal device, and the first terminal device and the second terminal device receive the second downlink control information from the network device, S205 may further be performed.

S205: The first terminal device and/or the second terminal device send/sends the first data to the network device; and correspondingly, the network device receives the first data.

When the first terminal device and/or the second terminal device enter/enters the transmission in the second stage, the first terminal device may send the first data or second data to the network device. The second terminal device may choose, depending on whether the first data is correctly received in the first stage, to forward the first data received in the first stage to the network device or not to forward the first data to the network device. The following describes in detail transmission of the second terminal device in the second stage.

Optionally, if the second terminal device receives, in the first stage, the first data from the first terminal device, where for example, the first data may be an OFDM symbol, and successfully decodes the first data to obtain original bits of the first data, in the transmission in the second stage, the second terminal device may send the first data to the network device by using a decode-and-forward transmission mode. For example, in the first stage, the second terminal device receives the first data, namely, a first bit, sent by the first terminal device through the PSSCH. The second terminal device receives the first data, and successfully decodes the first data to obtain original bits of the first data. Then, the second terminal device may perform operations such as scrambling, encoding, modulation, layer mapping, precoding, and OFDM symbol generation on the original bits based on the second transmission configuration information included in the second downlink control information, and send re-encoded and re-modulated data to the network device through the PUSCH in the transmission in the second stage. In this case, the second terminal device may assist the first terminal device in sending the first data to the network device, so that the first terminal device can use more transmission resources, and transmission efficiency can be improved.

Optionally, if the second terminal device receives, in the first stage, the first data from the first terminal device, where for example, the first data may be an OFDM symbol, but does not successfully decode the first data, and does not obtain original bits of the first data, in the transmission in the second stage, the second terminal device may send the first data to the network device by using an amplify-and-forward transmission mode. For example, the second terminal device receives, in the first stage, the first data sent by the first terminal device through the PSSCH, but the second terminal device fails in decoding the first data. Then, the second terminal device may directly send the first data to the network device through the PUSCH in the transmission in the second stage. It should be noted that because the second terminal device performs amplification and forwarding of the first data, the second transmission configuration information in the second downlink control information in this example does not indicate the modulation and coding scheme used by the second terminal device to transmit the PUSCH. Alternatively, an indication field that is in the second downlink control information and that is used to indicate the modulation and coding scheme used by the second terminal device to transmit the PUSCH is assigned with fixed values. For example, if the indication field occupies 4 bits, assigned values 0000 or 1111 indicate that the indication field is invalid.

Optionally, if the second terminal device receives, in the first stage, the first data from the first terminal device, but does not successfully decode the first data, where for example, the first data may be an OFDM symbol, and does not obtain original bits of the first data, in the transmission in the second stage, the second terminal device may give up sending the first data to the network device, and clear the received first data from a buffer, that is, the second terminal device uses a give-up-forwarding transmission mode, in other words, the second terminal device removes the first data from the buffer, or the second terminal device removes intermediate information, for example, soft information, from the buffer in a process of decoding the first data. It should be noted that because the second terminal device gives up forwarding the first data in any form, the second transmission configuration information in the second downlink control information in this example does not indicate the time domain resource, the frequency domain resource, and the modulation and coding scheme that are used by the second terminal device to transmit the PUSCH. Alternatively, an indication field that is in the second downlink control information and that is used to indicate the modulation and coding scheme used by the second terminal device to transmit the PUSCH is assigned with fixed values. For example, if the indication field occupies 4 bits, assigned values 0000 or 1111 indicate that the indication field is invalid.

It can be understood that this embodiment provide a data transmission method, and the method may be implemented through interaction between the network device, the first terminal device, and the second terminal device. The network device may use two independent PDCCHs to carry the first downlink control information and the second downlink control information respectively, and indicate, by using the first transmission configuration information included in the first downlink control information, the first terminal device and the second terminal device to perform transmission in the first stage. After the transmission in the first stage is completed, the network device indicates, by using the second transmission configuration information included in the second downlink control information, the first terminal device and the second terminal device to perform transmission in the second stage. The network device uses a two-level scheduling manner to improve the transmission efficiency in the second stage.

The following describes in detail user cooperative transmission in the second stage and a specific scheduling process. For example, after the transmission in the first stage is completed, that is, after the first terminal device sends the first data to the second terminal device, the network device performs scheduling in the second stage based on the feedback information received from the second terminal device.

In an example, when the feedback information received by the network device from the second terminal device is an ACK, the ACK indicates that, in the transmission in the first stage, the second terminal device obtains the first data carried on the PSSCH and successfully decodes the first data to obtain the original bits of the first data. The network device may send the second downlink control information to the first terminal device and the second terminal device through the PDCCH 2 to notify the first terminal device and the second terminal device to perform transmission in the second stage.

The second downlink control information carried on the PDCCH 2 includes a time domain resource, a frequency domain resource, a modulation and coding scheme, precoding information, power control information, and the like that are used by the first terminal device to transmit the PUSCH, and further includes a time domain resource, a frequency domain resource, a modulation and coding scheme, precoding information, power control information, and the like that are used by the second terminal device to transmit the PUSCH.

For example, second downlink control information shown in FIG. 5a includes an indication field of a time domain resource 3 and an indication field of a frequency domain resource 3 that indicate the first terminal device to transmit the PUSCH, and further includes an indication field of a time domain resource 4 and an indication field of a frequency domain resource 4 that indicate the second terminal device to transmit the PUSCH. Correspondingly, the first terminal device may send the PUSCH on the indicated time domain resource 3 and the indicated frequency domain resource 3, where the PUSCH carries data 1. The second terminal device may send the PUSCH on the indicated time domain resource 4 and the indicated frequency domain resource 4, where the PUSCH carries data 2. The data 1 and the data 2 may be the same or different. The data 2 is the first data received by the second terminal device in the transmission in the first stage. The data 1 may be the first data sent by the first terminal device to the second terminal device in the transmission in the first stage or may be second data different from the first data, and the second data is sent by the first terminal device to the network device in the transmission in the second stage.

It may be understood that when the data 1 and the data 2 are the same, it indicates that the second terminal device assists the first terminal device in transmitting the same data in the transmission in the second stage. This helps improve a data transmission success rate of the first terminal device. When the data 1 and the data 2 are different, it indicates that, in the transmission in the second stage, the second terminal device assists the first terminal device in transmitting the data of the first stage, and the first terminal device transmits new data, so that the first terminal device can transmit more data.

Figure 5B:
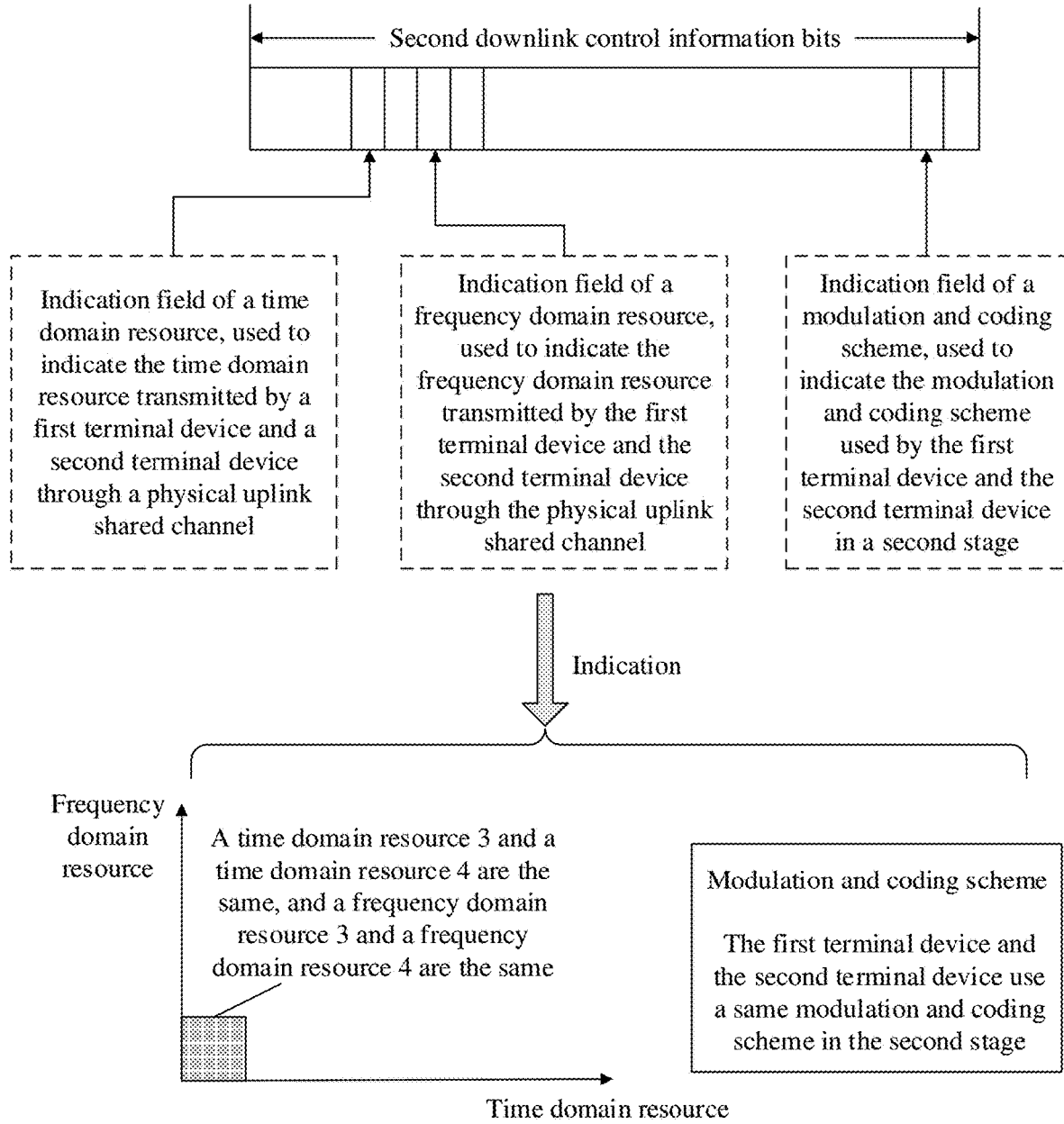
FIG. 5b is a schematic diagram of another resource configuration of user cooperative transmission in a second stage according to an embodiment.

In a feasible implementation, the time domain resource 3 and the time domain resource 4 are the same, the frequency domain resource 3 and the frequency domain resource 4 are the same, and modulation and coding schemes used by the first terminal device and the second terminal device in the transmission in the second stage are also the same. In this case, the DCI or RRC signaling carried on the PDCCH 2 includes a time domain resource indication field used to indicate the first terminal device and the second terminal device to transmit the PUSCH by using a same time domain resource, further includes a frequency domain resource indication field used to indicate the first terminal device and the second terminal device to transmit the PUSCH by using a same frequency domain resource, and further includes a modulation and coding scheme indication field used to indicate the first terminal device and the second terminal device to use a same modulation and coding scheme, as shown in FIG. 5*b*. According to the indication manner shown in FIG. 5*b*, the network device can indicate, by using fewer bits, a time-frequency resource configuration and a modulation and coding scheme configuration that are used by the first terminal device and the second terminal device to perform transmission in the second stage.

In a feasible implementation, the time domain resource 3 and the time domain resource 4 are the same, the frequency domain resource 3 and the frequency domain resource 4 are different, and the modulation and coding schemes used by the first terminal device and the second terminal device in the transmission in the second stage are different. In this case, the DCI or RRC signaling carried on the PDCCH 2 includes a time domain resource indication field used to indicate the first terminal device and the second terminal device to transmit the PUSCH by using a same time domain resource; further includes a frequency domain resource indication field 1 used to indicate the first terminal device to transmit the PUSCH by using a frequency domain resource 3, and a frequency domain resource indication field 1 used to indicate the second terminal device to transmit the PUSCH by using a frequency domain resource 4; and further includes a modulation and coding scheme indication field 1 used to indicate the first terminal device to use a modulation and coding scheme 3, and a modulation and coding scheme indication field 2 used to indicate the second terminal device to use a modulation and coding scheme 4, as shown in FIG. 5*c*.

Figure 5C:
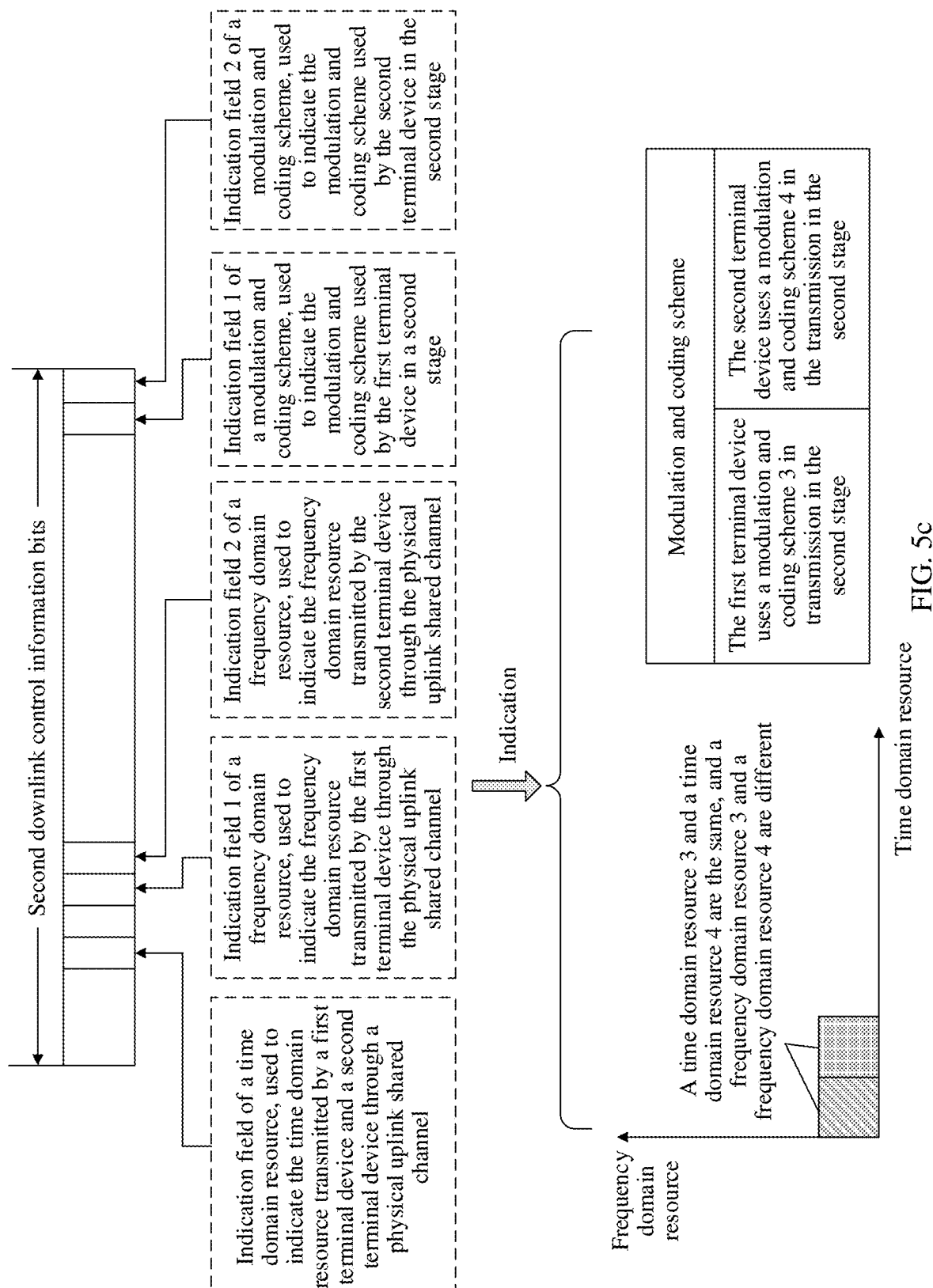
FIG. 5c is a schematic diagram of another resource configuration of user cooperative transmission in a second stage according to an embodiment.

According to the indication manner shown in FIG. 5*c*, the network device can separately configure optimal frequency domain resources and optimal modulation and coding schemes based on different channel conditions of the first terminal device and the second terminal device. This helps improve transmission performance in the second stage. In addition, the same time domain resource is configured for the first terminal device and the second terminal device, to prevent the network device from delaying scheduling the first terminal device or the second terminal device and avoid a transmission latency in the second stage.

In a feasible implementation, the time domain resource 3 and the time domain resource 4 are different, the frequency domain resource 3 and the frequency domain resource 4 are different, and the modulation and coding schemes used by the first terminal device and the second terminal device in the transmission in the second stage are different. In this case, the DCI or RRC signaling carried on the PDCCH 2 includes a time domain resource indication field 1 used to indicate the first terminal device to transmit the PUSCH by using a time domain resource 3, and a time domain resource indication field 2 used to indicate the second terminal device to transmit the PUSCH by using a time domain resource 4; the DCI or RRC signaling carried on the PDCCH 2 further includes a frequency domain resource indication field 1 used to indicate the first terminal device to transmit the PUSCH by using a frequency domain resource 3, and a frequency domain resource indication field 2 used to indicate the second terminal device to transmit the PUSCH by using a frequency domain resource 4; and the DCI or RRC signaling carried on the PDCCH 2 further includes a modulation and coding scheme indication field 1 used to indicate the first terminal device to use a modulation and coding scheme 3, and a modulation and coding scheme indication field 2 used to indicate the second terminal device to use a modulation and coding scheme 4, as shown in FIG. 5*d*.

Figure 5D:
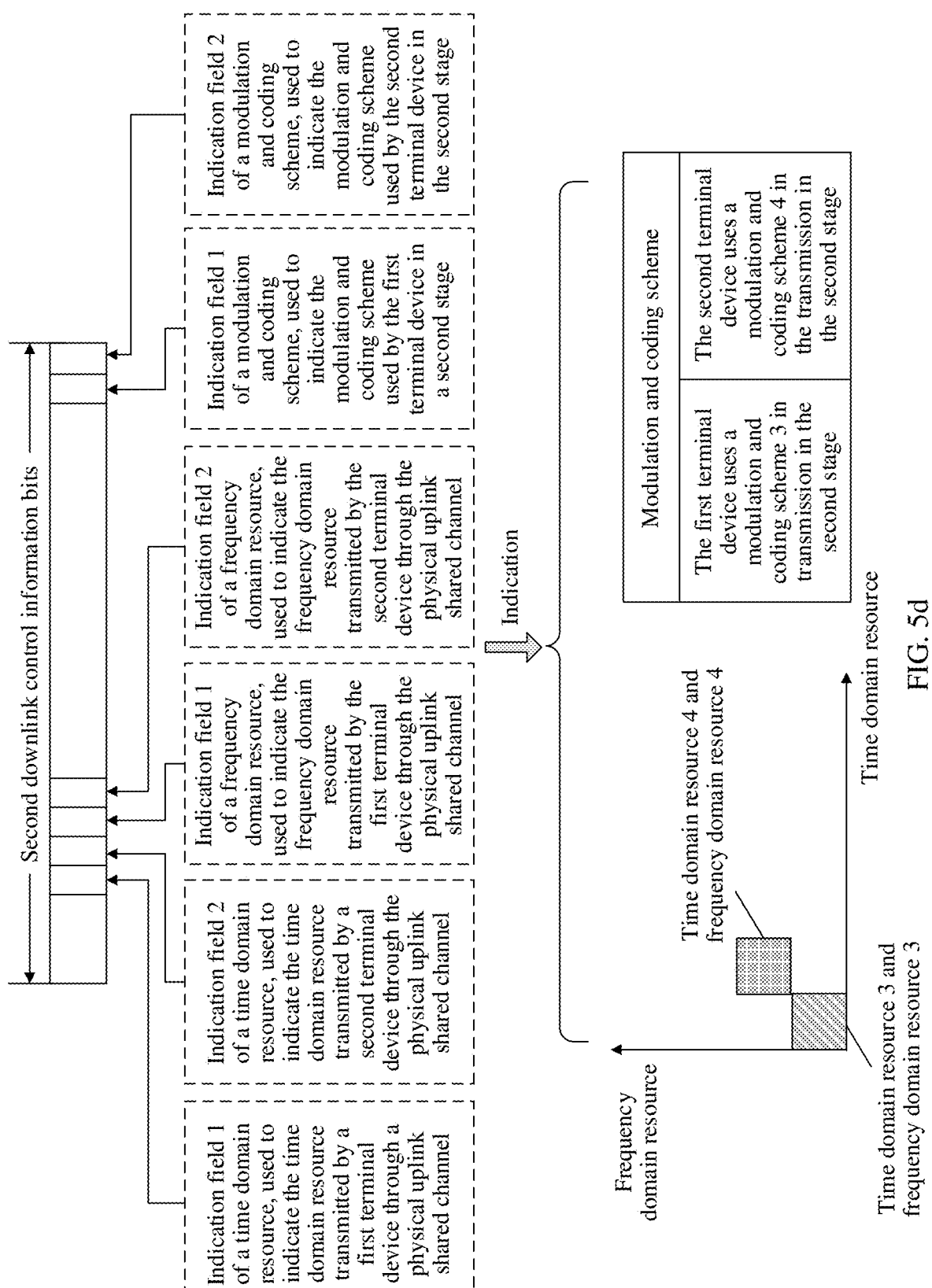
FIG. 5d is a schematic diagram of another resource configuration of user cooperative transmission in a second stage according to an embodiment.

According to the indication manner shown in FIG. 5*d*, the network device can separately configure optimal time domain resources, frequency domain resources, and modulation and coding schemes based on different channel conditions of the first terminal device and the second terminal device. This helps improve transmission performance in the second stage.

It may be understood that the DCI or RRC signaling carried on the PDCCH 2 shown in FIG. 5*a* to FIG. 5*d* may further include precoding information indication fields used to indicate precoding information of the first terminal device and the second terminal device, or power control information indication fields used to indicate power control information of the first terminal device and the second terminal device. For the time domain resource indication field, the frequency domain resource indication field, or the modulation and coding scheme indication field, each indication field may occupy one or more bits in the DCI. Details are not described herein again.

It can be understood that, in this example, when the feedback information received by the network device from the second terminal device is the ACK, the network device may use different indication manners to indicate the first terminal device and the second terminal device to perform user cooperative transmission in the second stage. In this way, the first terminal device and the second terminal device send the data of the first terminal device to the network device in manners such as time division multiplexing, frequency division multiplexing, and space division multiplexing in the transmission in the second stage. This helps improve uplink transmission performance of the first terminal device.

In an example, when the feedback information received by the network device from the second terminal device is a NACK, the NACK indicates that, in the transmission in the first stage, the second terminal device obtains the first data carried on the PSSCH, but does not successfully decode the first data (that is, does not obtain the original bits of the first data), and the maximum quantity of retransmission times is already reached. The network device may send the second downlink control information to the first terminal device and the second terminal device through the PDCCH 2 to notify the first terminal device and the second terminal device to perform transmission in the second stage.

The DCI or RRC signaling carried on the PDCCH 2 includes a time domain resource indication field, a frequency domain resource indication field, a modulation and coding scheme indication field, and the like that indicate the first terminal device to transmit the PUSCH, and further includes a time domain resource indication field, a frequency domain resource indication field, a modulation and coding scheme indication field, and the like that indicate the second terminal device to transmit the PUSCH. For example, the DCI or RRC signaling carried on the PDCCH 2 includes a time domain resource indication field 1, a frequency domain resource indication field 1, and a modulation and coding scheme indication field 1 that indicate the first terminal device to transmit the PUSCH, and further includes a time domain resource indication field 2, a frequency domain resource indication field 2, and a modulation and coding scheme indication field 2 that indicate the second terminal device to transmit the PUSCH.

For specific configuration manners of a time domain resource 3, a frequency domain resource 3, and a modulation and coding scheme 3 that are used by the first terminal device to transmit the PUSCH, and a time domain resource 4, a frequency domain resource 4, and a modulation and coding scheme 4 that are used by the second terminal device to transmit the PUSCH, refer to descriptions in the examples shown in FIG. 5a to FIG. 5d. Details are not described herein again.

It should be noted that when the feedback information received by the network device from the second terminal device is the NACK, in a feasible implementation, the second terminal device may send the first data to the network device in an amplify-and-forward manner in the transmission in the second stage. In this case, the DCI or RRC signaling carried on the PDCCH 2 does not include the modulation and coding scheme indication field that indicates the second terminal device to transmit the PUSCH.

Figure 6A:
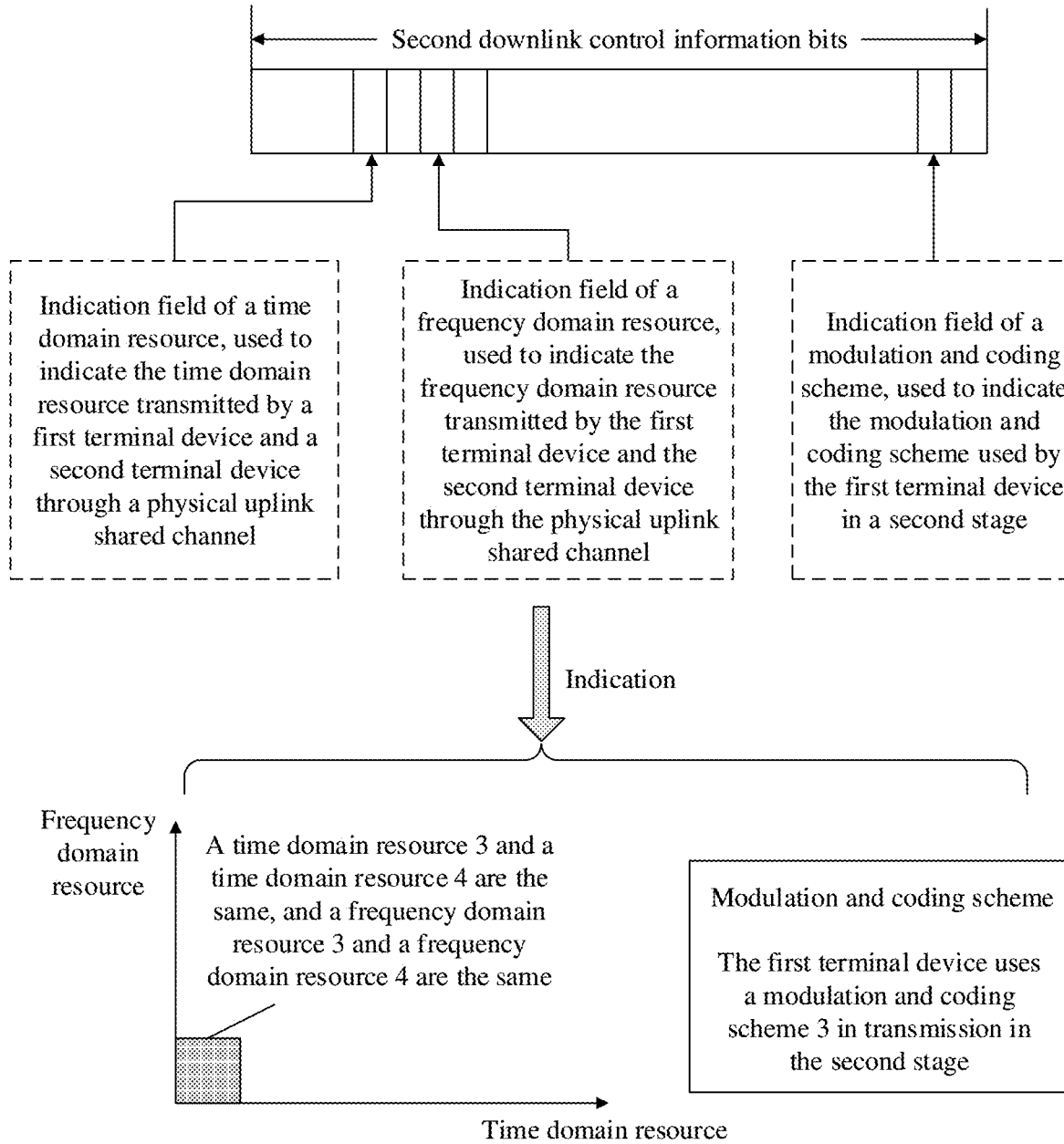
FIG. 6a is a schematic diagram of another resource configuration of user cooperative transmission in a second stage according to an embodiment.

For example, when the time domain resource 3 and the time domain resource 4 are the same, the frequency domain resource 3 and the frequency domain resource 4 are the same, and the first terminal device uses the modulation and coding scheme 3, the second downlink control information and information indicated by the second downlink control information are shown in FIG. 6a. It is different from FIG. 5b that, the DCI or RRC signaling carried on the PDCCH 2 does not include the modulation and coding scheme used by the second terminal device.

Figure 6B:
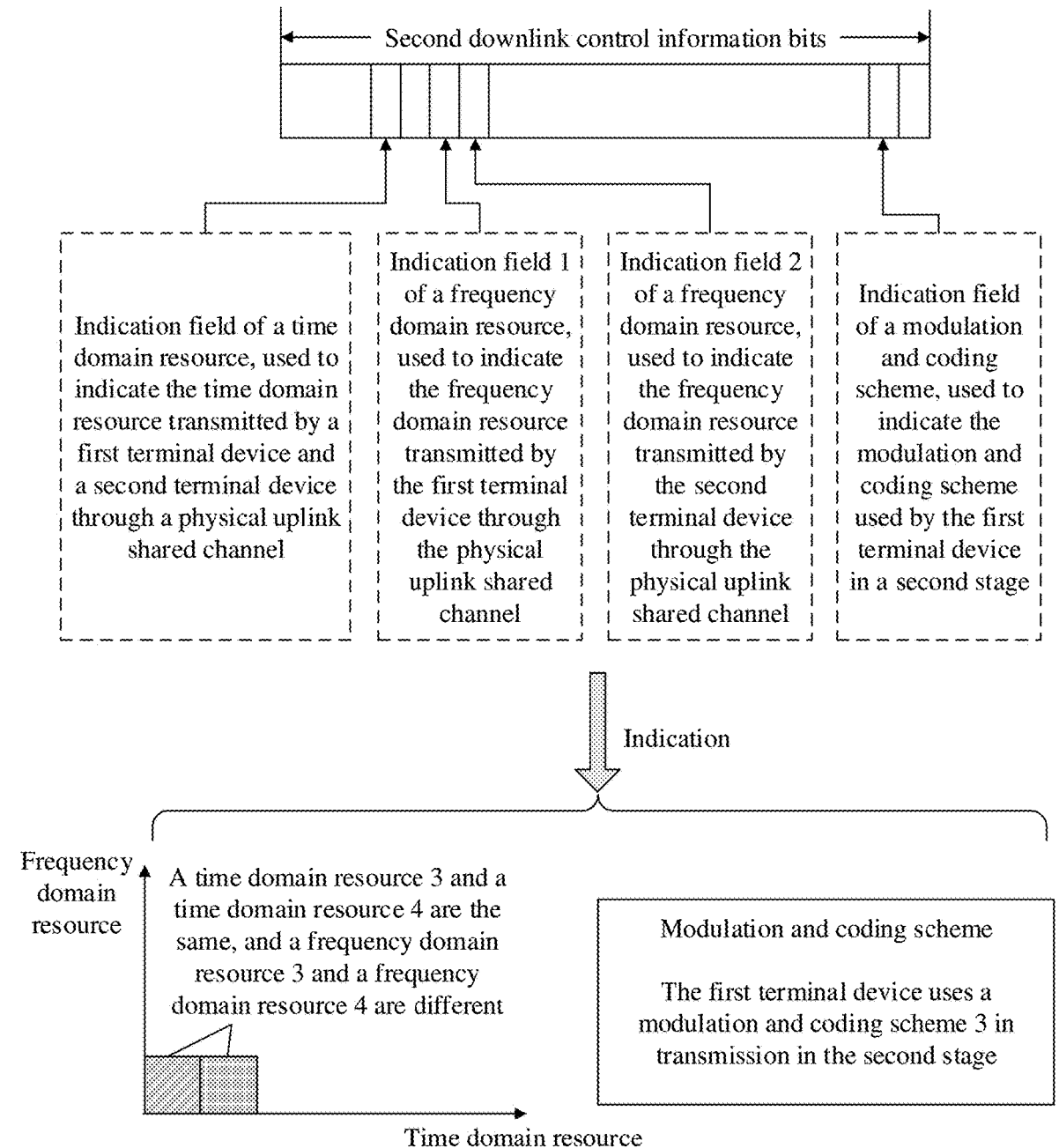
FIG. 6b is a schematic diagram of another resource configuration of user cooperative transmission in a second stage according to an embodiment.

For another example, when the time domain resource 3 and the time domain resource 4 are the same, the frequency domain resource 3 the frequency domain resource 4 are different, and the first terminal device uses the modulation and coding scheme 3, the second downlink control information and information indicated by the second downlink control information are shown in FIG. 6b. It is different from FIG. 5c that, the DCI or RRC signaling carried on the PDCCH 2 does not include the modulation and coding scheme used by the second terminal device.

Figure 6C:
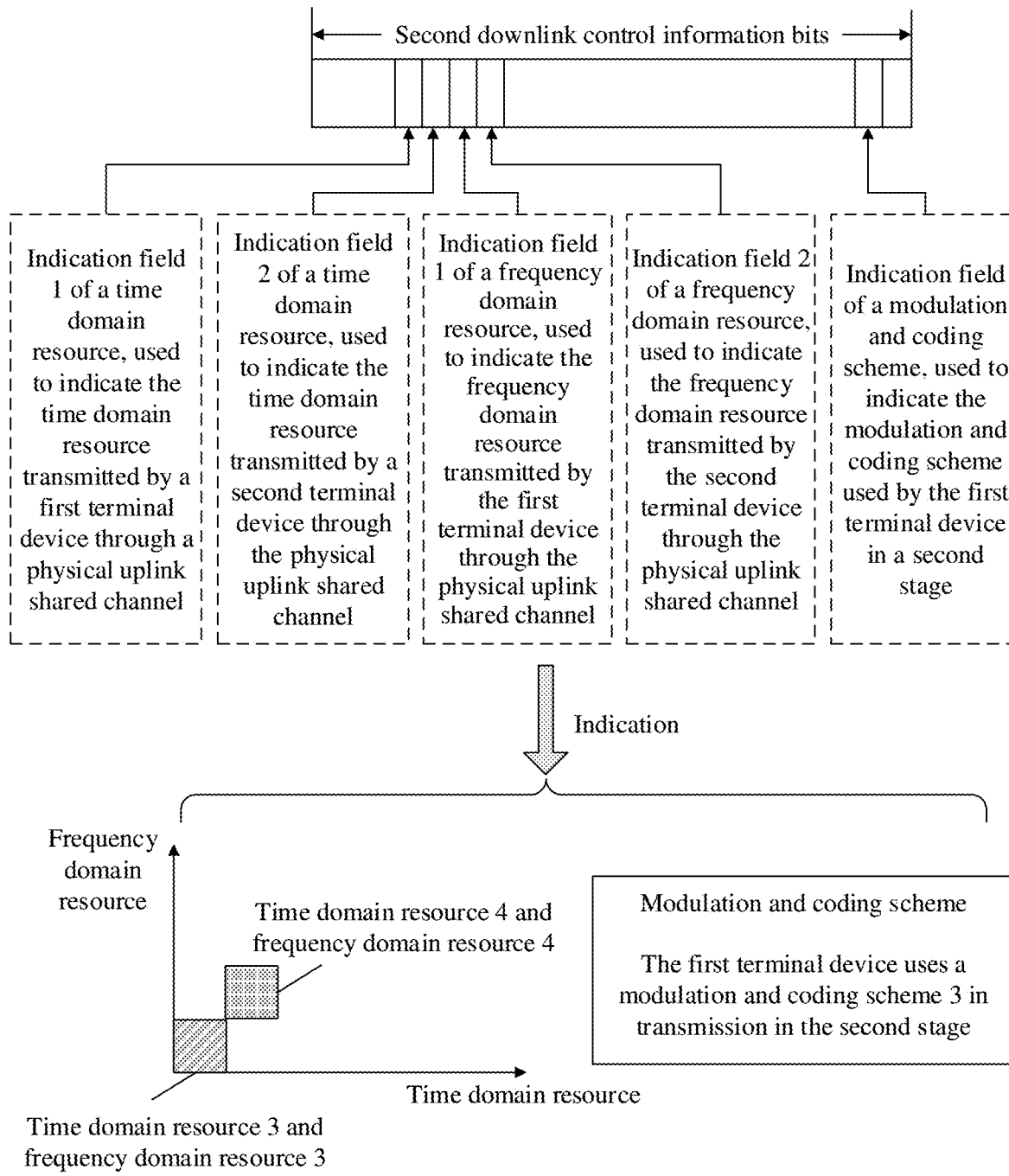
FIG. 6c is a schematic diagram of another resource configuration of user cooperative transmission in a second stage according to an embodiment.

For another example, when the time domain resource 3 and the time domain resource 4 are different, the frequency domain resource 3 the frequency domain resource 4 are different, and the first terminal device uses the modulation and coding scheme 3, the second downlink control information and information indicated by the second downlink control information are shown in FIG. 6c. It is different from FIG. 5d that, the DCI or RRC signaling carried on the PDCCH 2 does not include the modulation and coding scheme used by the second terminal device.

Figure 7:
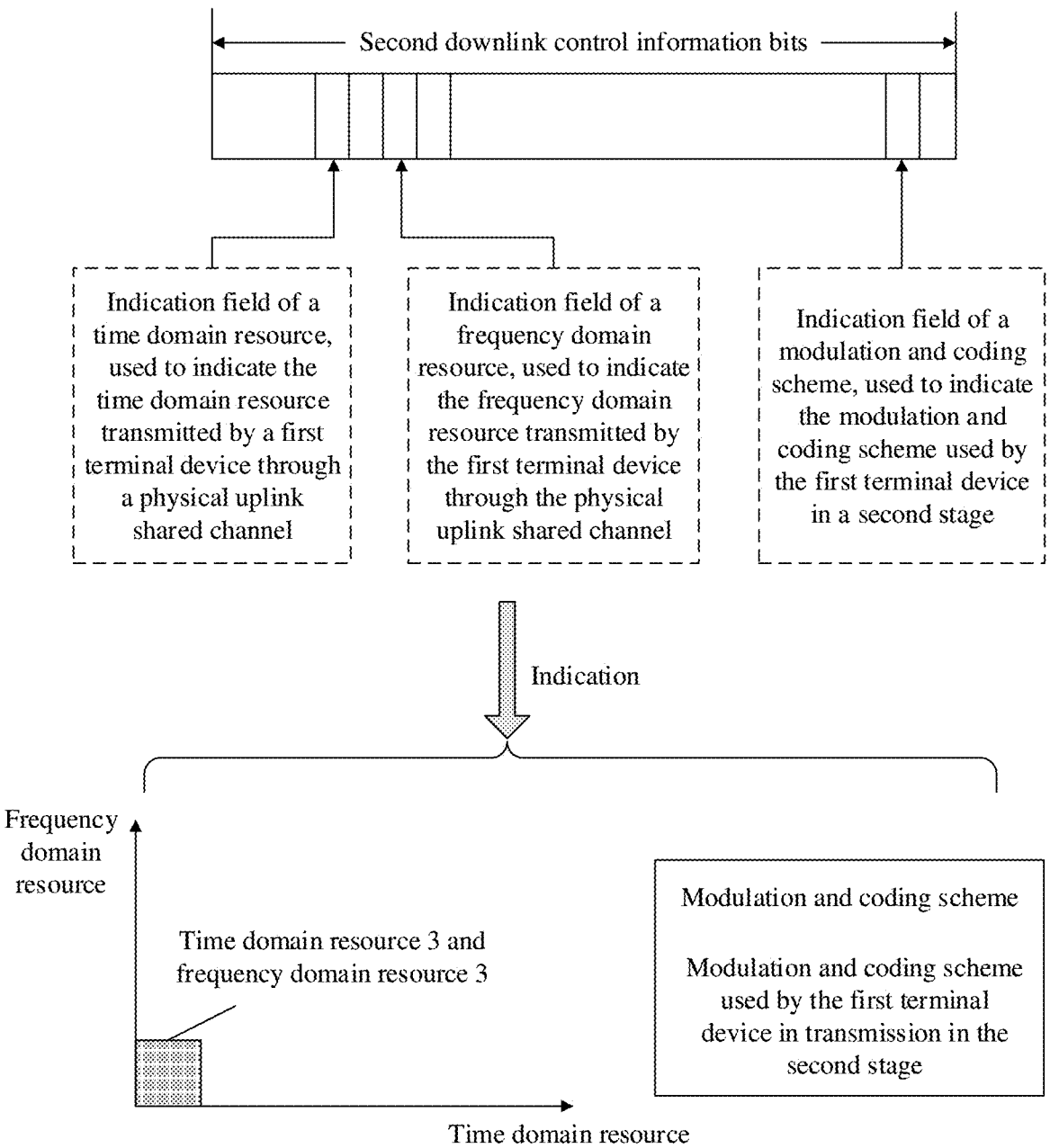
FIG. 7 is a schematic diagram of another resource configuration of user cooperative transmission in a second stage according to an embodiment.

In another feasible implementation, the second terminal device may give up sending the first data to the network device in the transmission in the second stage. In this case, the DCI or RRC signaling carried on the PDCCH 2 does not include the time domain resource, the frequency domain resource, and the modulation and coding scheme that are used by the second terminal device to transmit the PUSCH. For example, information indicated by the second transmission configuration information is shown in FIG. 7. The DCI or RRC signaling carried on the PDCCH 2 includes only a time domain resource indication field corresponding to the time domain resource 3, a frequency domain resource indication field corresponding to the frequency domain resource 3, and a modulation and coding scheme indication field corresponding to the modulation and coding scheme 3 that indicate the first terminal device to transmit the PUSCH.

It may be understood that, in the plurality of examples shown in FIG. 4a to FIG. 7, when a communication cooperation group including only one SUE and one CUE is shown, a case in which the first downlink control information and the second downlink control information indicate transmission configurations of the SUE and the CUE is used as an example. When the communication cooperation group includes a plurality of SUEs and a plurality of CUEs, the first downlink control information and the second downlink control information may indicate transmission configurations of the plurality of SUEs and the plurality of CUEs. For example, if the communication cooperation group includes one SUE and two CUEs, in the embodiment shown in FIG. 4a, first downlink control information bits further include an indication field of the time domain resource 3 and an indication field of the frequency domain resource 3, to indicate transmission configurations of the different CUEs. This is not limited in this embodiment.

In an example, the network device may further notify, by using the second downlink control information, the first terminal device and the second terminal device of a transmission mode to be used to perform transmission in the second stage. In the transmission in the second stage, the first terminal device sends the first data or the second data to the network device by using a transmission mode. The second terminal device may send the first data to the network device by using any one of a decode-and-forward transmission mode, an amplify-and-forward transmission mode, or a give-up-forwarding transmission mode.

Figure 8:
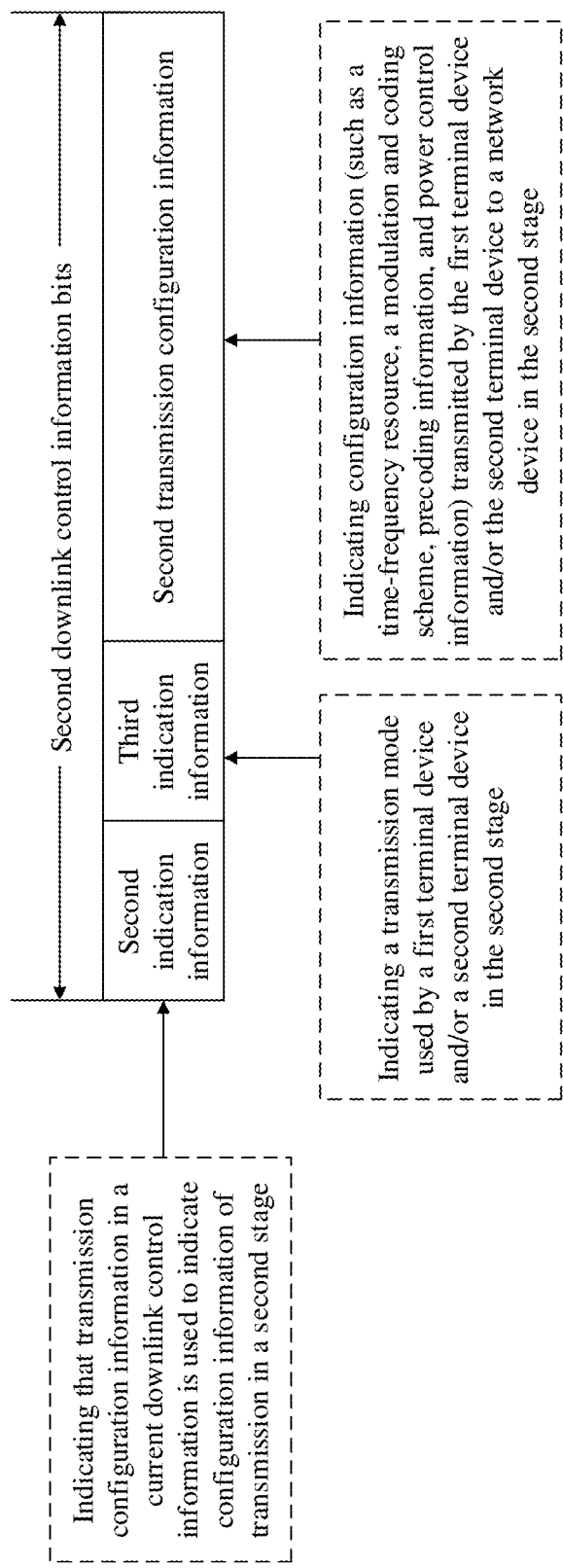
FIG. 8 is a schematic diagram of second downlink control information according to an embodiment.

In a feasible implementation, the network device may notify, by using an explicit indication manner, the first terminal device and the second terminal device of a transmission mode to be used to perform transmission in the second stage. The network device may indicate, by adding third indication information to the second downlink control information carried on the PDCCH 2, a transmission mode to be used by the first terminal device and the second terminal device to perform transmission in the second stage, as shown in FIG. 8.

The third indication information may be represented by occupying new bits different from the second indication information or may reuse the bits used by the second indication information. This is not limited in this embodiment. For example, in an explicit indication manner, the third indication information occupies two bits for indication. If values are 00, the first terminal device is indicated to send the first data or the second data to the network device, and the second terminal device is indicated to send the first data to the network device by using the decode-and-forward transmission mode; if values are 01, the first terminal device is indicated to send the first data or the second data to the network device, and the second terminal device is indicated to send the first data to the network device by using the amplify-and-forward transmission mode; if values are 10, the first terminal device is indicated to send the first data or the second data to the network device, and the second terminal device is indicated to use the give-up-forwarding transmission mode. According to the foregoing explicit indication manner, the network device can more flexibly configure the transmission in the second stage.

For another example, in another explicit indication manner, the third indication information occupies one bit for indication. If a value is 0, the first terminal device is indicated to send the first data or the second data to the network device, and the second terminal device is indicated to send the first data to the network device by using the decode-and-forward transmission mode; if a value is 1, the first terminal device is indicated to send the first data or the second data to the network device, and the second terminal device is indicated to send the first data to the network device by using the amplify-and-forward transmission mode.

For another example, in another explicit indication manner, the third indication information occupies one bit for indication. If a value is 0, the first terminal device is indicated to send the first data or the second data to the network device, and the second terminal device is indicated to send the first data to the network device by using the decode-and-forward transmission mode; if a value is 1, the first terminal device is indicated to send the first data or the second data to the network device, and the second terminal device is indicated to use the give-up-forwarding transmission mode.

According to the foregoing explicit indication manner, the network device can reduce a quantity of bits of the second downlink control information. It may be understood that the value of the third indication information is only used to distinguish which transmission mode is the transmission mode indicated in the third indication information. A specific transmission mode to which a specific value corresponds is not limited in this embodiment.

In a feasible implementation, the network device may notify, by using an implicit indication manner, the first terminal device and the second terminal device of a transmission mode to be used to perform transmission in the second stage. In the implicit indication manner, new indication information is not added to the second downlink control information to indicate a transmission mode to be used by the first terminal device and the second terminal device to perform transmission in the second stage, and the first terminal device and the second terminal device perform transmission in the second stage in a transmission mode preset in a communication protocol.

For example, in an implicit indication manner, for the second terminal device, when the second terminal device receives the first data in the transmission in the first stage and successfully decodes the first data, the second terminal device sends the first data to the network device by using the decode-and-forward transmission mode in the transmission in the second stage; when the second terminal device receives the first data in the transmission in the first stage but fails in decoding the first data, the second terminal device sends the first data to the network device by using the amplify-and-forward transmission mode in the transmission in the second stage.

For another example, in another implicit indication manner, for the second terminal device, when the second terminal device receives the first data in the transmission in the first stage and successfully decodes the first data, the second terminal device sends the first data to the network device by using the decode-and-forward transmission mode in the transmission in the second stage; when the second terminal device receives the first data in the transmission in the first stage but fails in decoding the first data, the second terminal device uses the give-up-forwarding transmission mode in the transmission in the second stage. Compared with the explicit indication manners, the foregoing two implicit indication manners enable the network device to reduce a quantity of bits of the second downlink control information.

In a feasible implementation, the network device may notify, by using a manner combining an explicit indication and an implicit indication, the first terminal device and the second terminal device of a transmission mode to be used to perform transmission in the second stage. The network device may indicate, by adding third indication information to the second downlink control information carried on the PDCCH 2, a transmission mode to be used by the first terminal device and the second terminal device to perform transmission in the second stage.

For example, in an indication manner combining an explicit indication and an implicit indication, when the third indication information occupies one bit for indication, for the second terminal device, when the second terminal device receives the first data in the transmission in the first stage and successfully decodes the first data, regardless of the value of the third indication information, the second terminal device sends the first data to the network device by using the decode-and-forward transmission mode; when the second terminal device receives the first data in the transmission in the first stage but fails in decoding the first data, if the value of the third indication information is 0, the second terminal device sends the first data to the network device by using the amplify-and-forward transmission mode; if the value of the third indication information is 1, the second terminal device uses the give-up-forwarding transmission mode. Compared with the explicit indication manners, the foregoing manner combining an explicit indication and an implicit indication enable the network device to reduce a quantity of bits of the second downlink control information.

Figure 9:
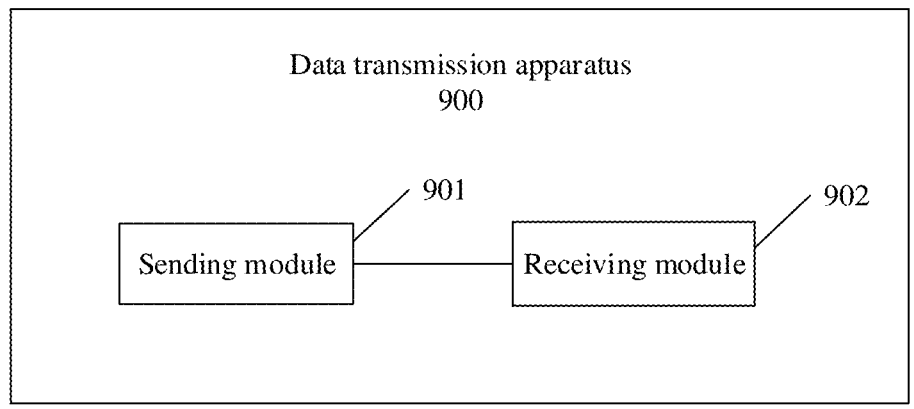
FIG. 9 is a schematic diagram of a structure of a data transmission apparatus according to an embodiment.
Figure 10:
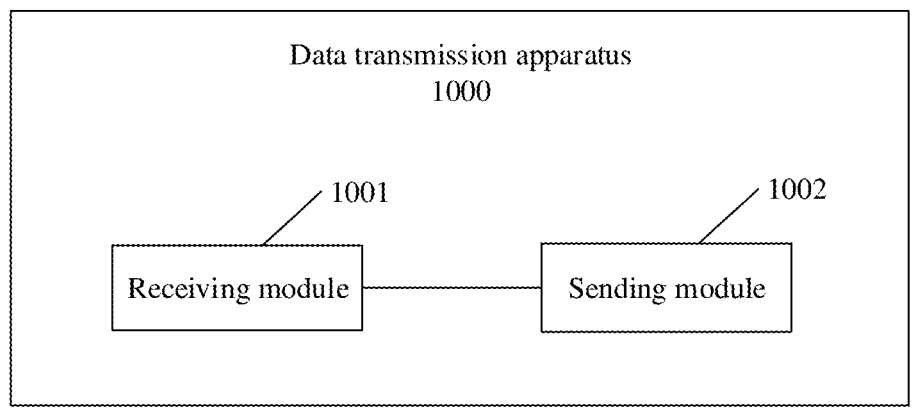
FIG. 10 is a schematic diagram of a structure of a data transmission apparatus according to an embodiment.
Figure 11:
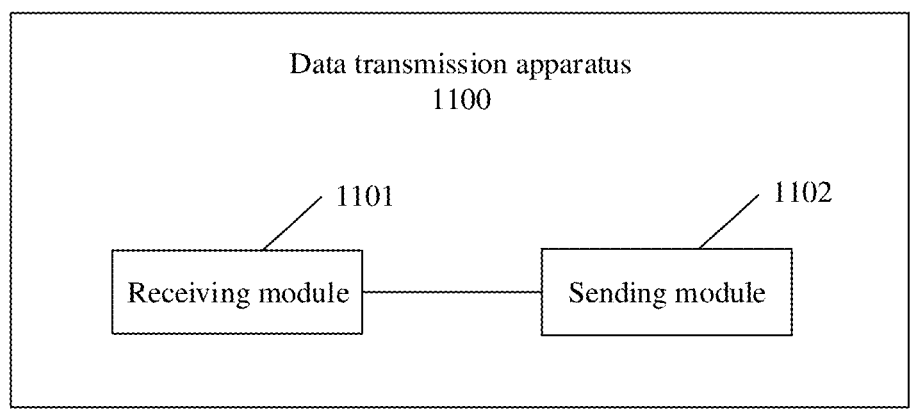
FIG. 11 is a schematic diagram of a structure of a data transmission apparatus according to an embodiment.

The following describes in detail related apparatuses in embodiments with reference to FIG. 9 to FIG. 11.

An embodiment provides a schematic diagram of a structure of a data transmission apparatus 900. As shown in FIG. 9, the data transmission apparatus 900 may be configured to implement the data transmission method performed by the network device in the embodiment shown in FIG. 2. The data transmission apparatus 900 may include:

a sending module 901, configured to send first downlink control information to a first terminal device and a second terminal device, where the first downlink control information includes first transmission configuration information, the first transmission configuration information indicates a sidelink resource and/or a sidelink transmission parameter used by the first terminal device to send first data to the second terminal device, a destination receive end of the first data is the network device, and the first terminal device and the second terminal device belong to a same cooperation group, where the sending module 901 is further configured to send second downlink control information to the first terminal device and the second terminal device, where the second downlink control information includes second transmission configuration information, and the second transmission configuration information indicates an uplink resource and/or an uplink transmission parameter used by the first terminal device and/or the second terminal device to send the first data to the network device.

In an implementation, the data transmission apparatus 900 further includes a receiving module 902, where the receiving module 902 is configured to receive the first data from the first terminal device and/or the second terminal device.

In an implementation, the receiving module 902 is further configured to:

receive feedback information from the second terminal device, where the feedback information is used to indicate whether the second terminal device correctly receives the first data.

In an implementation, a format of the first downlink control information and a format of the second downlink control information are different.

In an implementation, the first downlink control information is scrambled by using a first identifier, and the second downlink control information is scrambled by using a second identifier.

In an implementation, the first downlink control information further includes first indication information, and the first indication information is used to indicate the first terminal device to send the first data to the second terminal device through a sidelink.

In an implementation, the second downlink control information further includes second indication information, and the second indication information is used to indicate the first terminal device and/or the second terminal device to send the first data to the network device through an uplink.

In an implementation, the second downlink control information further includes third indication information, and the third indication information indicates a transmission mode used by the second terminal device to send the first data to the network device.

In an implementation, the feedback information is used to indicate that the second terminal device correctly receives the first data; and the third indication information indicates a decode-and-forward transmission mode used by the second terminal device to send the first data to the network device.

In an implementation, the feedback information is used to indicate that the second terminal device does not correctly receive the first data; and the third indication information indicates an amplify-and-forward transmission mode or a give-up-forwarding transmission mode used by the second terminal device to send the first data to the network device.

It should be noted that the apparatus in the foregoing embodiments may be a network device or may be a chip used in a network device, or another combined part, component, or the like that can implement a function of the foregoing network device.

When the apparatus is a network device or a combined part that can implement functions of the foregoing network device, the sending module may be a transmitter, and may include an antenna, a radio frequency circuit, and the like, and the receiving module may be a receiver, and may include an antenna, a radio frequency circuit, and the like.

When the apparatus is a component having a function of the foregoing network device, the sending module may be a radio frequency unit, the receiving module may be a radio frequency unit, and the processing module may be a processor. When the apparatus is a chip system, the sending module may be an output interface of the chip system, and the receiving module may be an input interface of the chip system.

The apparatus may further include a processing module. The processing module may control the receiving module and the sending module to implement a communication process. When the apparatus is a network device or a combined part that can implement functions of the foregoing network device, the processing module may be a processor, for example, a baseband chip. When the apparatus is a chip system, the processing module may be a processor of the chip system, for example, a central processing unit (CPU).

An embodiment provides a schematic diagram of a structure of a data transmission apparatus 1000. As shown in FIG. 10, the data transmission apparatus 1000 may be configured to implement the data transmission method performed by the first terminal device in the embodiment shown in FIG. 2. The data transmission apparatus 1000 may include:

a receiving module 1001, configured to receive first downlink control information from a network device, where the first downlink control information includes first transmission configuration information, the first transmission configuration information indicates a sidelink resource and/or a sidelink transmission parameter used by the first terminal device to send first data to a second terminal device, a destination receive end of the first data is the network device, and the first terminal device and the second terminal device belong to a same cooperation group; and a sending module 1002, configured to send the first data to the second terminal device, where the receiving module 1001 is further configured to receive second downlink control information from the network device, where the second downlink control information includes second transmission configuration information, and the second transmission configuration information indicates an uplink resource and/or an uplink transmission parameter used by the first terminal device and/or the second terminal device to send the first data to the network device.

In an implementation, the sending module 1002 is further configured to send the first data to the network device.

In an implementation, the first downlink control information further includes first indication information, and the first indication information is used to indicate the first terminal device to send the first data to the second terminal device through a sidelink.

In an implementation, the second downlink control information further includes second indication information, and the second indication information is used to indicate the first terminal device to send the first data to the network device through an uplink.

It should be noted that the apparatus in the foregoing embodiments may be a terminal device or may be a chip used in a terminal device, or another combined part, component, or the like that can implement a function of the foregoing terminal device.

When the apparatus is a terminal device or a combined part that can implement functions of the foregoing terminal device, the sending module may be a transmitter, and may include an antenna, a radio frequency circuit, and the like, and the receiving module may be a receiver, and may include an antenna, a radio frequency circuit, and the like.

When the apparatus is a component having a function of the foregoing terminal device, the sending module may be a radio frequency unit, the receiving module may be a radio frequency unit, and the processing module may be a processor. When the apparatus is a chip system, the sending module may be an output interface of the chip system, and the receiving module may be an input interface of the chip system.

The apparatus may further include a processing module. The processing module may control the receiving module and the sending module to implement a communication process. When the apparatus is a terminal device or a combined part that can implement functions of the foregoing network device, the processing module may be a processor, for example, a baseband chip. When the apparatus is a chip system, the processing module may be a processor of the chip system, for example, a central processing unit (CPU).

An embodiment provides a schematic diagram of a structure of a data transmission apparatus 1100. As shown in FIG. 11, the data transmission apparatus 1100 may be configured to implement the data transmission method performed by the second terminal device in the embodiment shown in FIG. 2. The data transmission apparatus 1100 may include:

- a receiving module 1101, configured to receive first downlink control information from a network device, where the first downlink control information includes first transmission configuration information, the first transmission configuration information indicates a sidelink resource and/or a sidelink transmission parameter used by a first terminal device to send first data to the second terminal device, a destination receive end of the first data is the network device, and the first terminal device and the second terminal device belong to a same cooperation group, where
- the receiving module 1101 is further configured to receive the first data from the first terminal device; and
- a sending module 1102, configured to send feedback information to the network device, where the feedback information is used to indicate whether the second terminal device correctly receives the first data, where
- the receiving module 1101 is further configured to receive second downlink control information from the network device, where the second downlink control information includes second transmission configuration information, and the second transmission configuration information indicates an uplink resource and/or an uplink transmission parameter used by the first terminal device and/or the second terminal device to send the first data to the network device.

In an implementation, the second downlink control information further includes third indication information, and the third indication information indicates a transmission mode used by the second terminal device to send the first data to the network device.

In an implementation, the feedback information is used to indicate that the second terminal device correctly receives the first data; and the sending module is further configured to send the first data to the network device by using a decode-and-forward transmission mode.

In an implementation, the feedback information is used to indicate that the second terminal device does not correctly receive the first data; and the sending module is further configured to send the first data to the network device by using an amplify-and-forward transmission mode; or the sending module is further configured to clear the first data from a buffer by using a give-up-forwarding transmission mode.

It should be noted that the apparatus in the foregoing embodiments may be a network device or a terminal device, a chip used in a network device, a terminal device, or another combined part, component, or the like that has a function of the foregoing network device or terminal device.

When the apparatus is a network device, a terminal device or a combined part that can implement functions of the foregoing network device or terminal device, the sending module may be a transmitter, and may include an antenna, a radio frequency circuit, and the like, and the receiving module may be a receiver, and may include an antenna, a radio frequency circuit, and the like.

When the apparatus is a component having a function of the foregoing network device or terminal device, the sending module may be a radio frequency unit, the receiving module may be a radio frequency unit, and the processing module may be a processor. When the apparatus is a chip system, the sending module may be an output interface of the chip system, and the receiving module may be an input interface of the chip system.

The apparatus may further include a processing module. The processing module may control the receiving module and the sending module to implement a communication process. When the apparatus is a network device, a terminal device, or a combined part that can implement functions of the foregoing network device or terminal device, the processing module may be a processor, for example, a baseband chip. When the apparatus is a chip system, the processing module may be a processor of the chip system, for example, a central processing unit (central processing unit, CPU).

Figure 12:
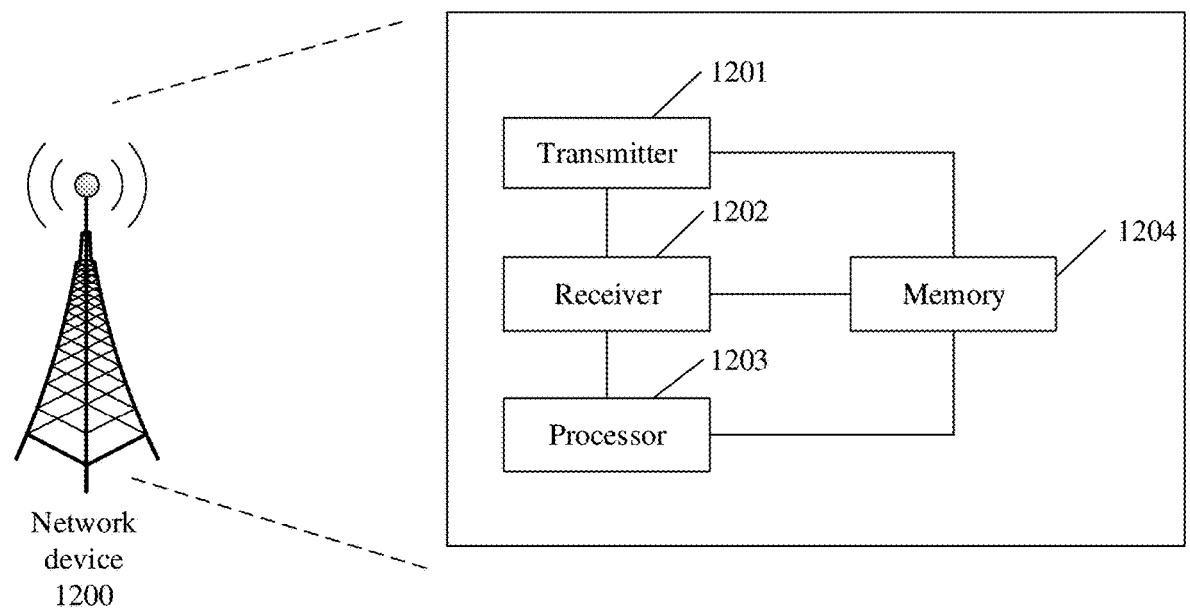
FIG. 12 is a schematic diagram of a structure of a network device according to an embodiment.
Figure 13:
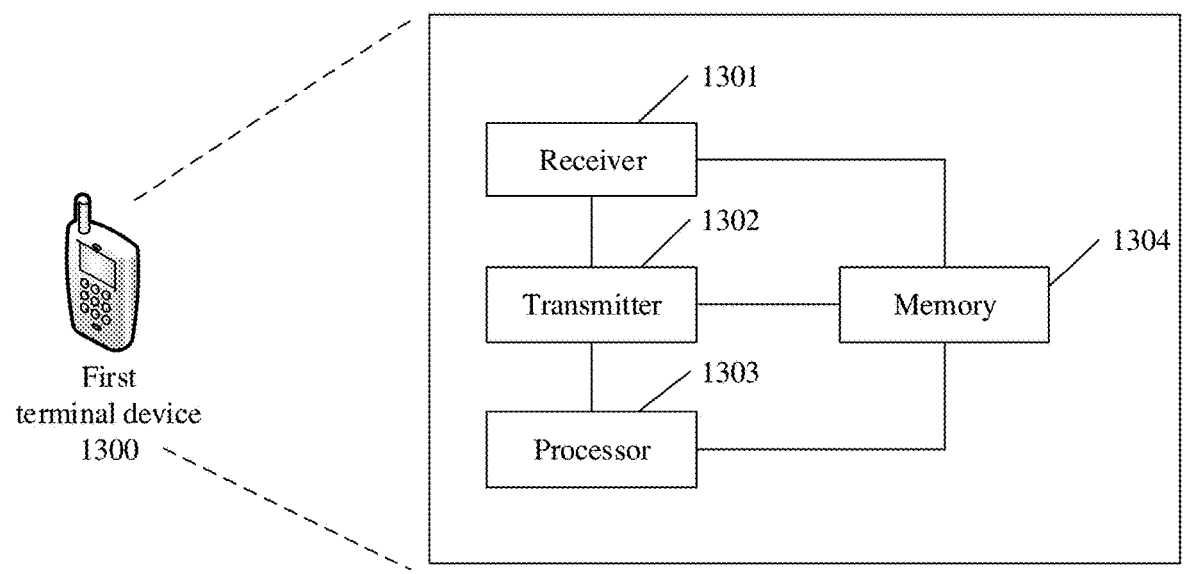
FIG. 13 is a schematic diagram of a structure of a first terminal device according to an embodiment.
Figure 14:
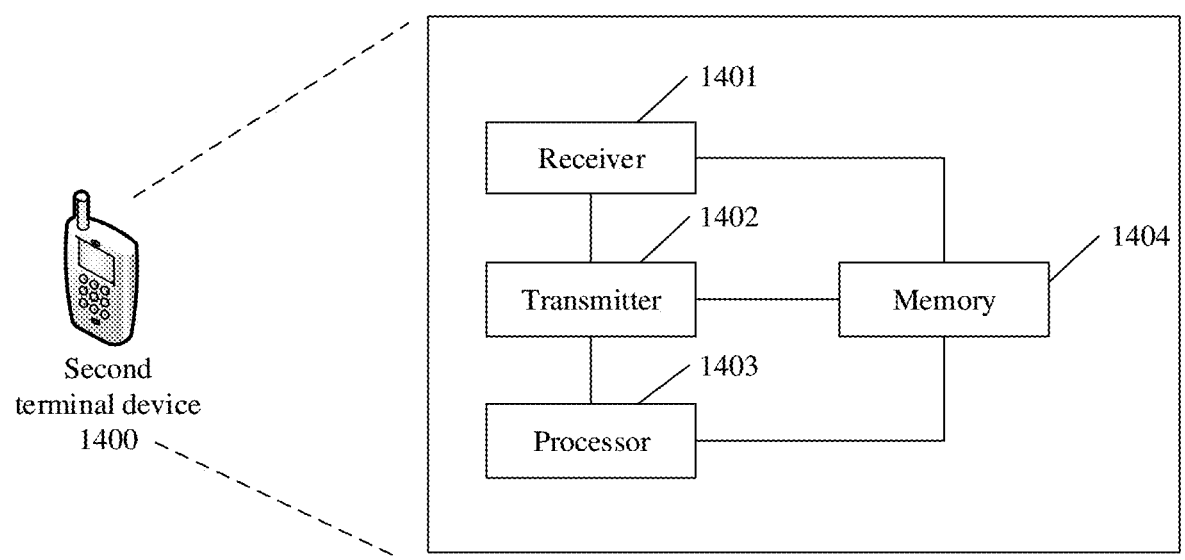
FIG. 14 is a schematic diagram of a structure of a second terminal device according to an embodiment.

The following describes in detail related devices in embodiments with reference to FIG. 12 to FIG. 14.

FIG. 12 is a schematic diagram of a structure of a network device or a combined part that can implement functions of the foregoing network device according to an embodiment. As shown in FIG. 12, the network device may be used in the system shown in FIG. 1 and perform functions of the network device in the method embodiment shown in FIG. 2. For ease of description, FIG. 12 shows only main components of the network device. As shown in FIG. 12, a network device 1200 may include a transmitter 1201 and a receiver 1202. The transmitter 1201 may also be referred to as a transmitter machine, a transmitter, a transmitter circuit, or the like. For example, a related function implemented by the sending module 901 shown in FIG. 9 may be implemented by the transmitter 1201. The receiver 1202 may also be referred to as a receiver machine, an input port, a receiving circuit, or the like. For example, a related function implemented by the receiving module 902 shown in FIG. 9 may be implemented by the receiver 1202. Optionally, the transmitter 1201 and the receiver 1202 shown in FIG. 12 may also be considered as a transceiver. The transceiver may also be referred to as a transceiver machine, a transceiver apparatus, or the like, and may implement related functions of the sending module 901 and the receiving module 902 shown in FIG. 9.

The network device 1200 may further include a processor 1203 configured to: process data to be sent by the transmitter 1201, or process data received by the receiver 1202. The processor 1203 may include one or more processors. For example, the processor 1203 may be one or more central processing units (CPU), one or more network processors (network processor, NP), one or more hardware chips, or any combination thereof. When the processor 1203 is one CPU, the CPU may be a single-core CPU, or may be a multi-core CPU.

The network device 1200 may further include a memory 1204, and the memory 1204 is configured to store program code and the like. The memory 1204 may include a volatile memory, for example, a random access memory (RAM). The memory 1204 may also include a non-volatile memory, for example, a read-only memory (ROM), a flash memory, a hard disk drive (HDD), or a solid-state drive (SSD). The memory 1204 may further include a combination of the foregoing types of memories.

The transmitter 1201 and the receiver 1202 may be used to implement the data transmission method performed by the network device in the embodiment shown in FIG. 2. The transmitter 1201 is configured to send first downlink control information to a first terminal device and a second terminal device, where the first downlink control information includes first transmission configuration information, the first transmission configuration information indicates a sidelink resource and/or a sidelink transmission parameter used by the first terminal device to send first data to the second terminal device, a destination receive end of the first data is the network device, and the first terminal device and the second terminal device belong to a same cooperation group. The transmitter 1201 is further configured to send second downlink control information to the first terminal device and the second terminal device, where the second downlink control information includes second transmission configuration information, and the second transmission configuration information indicates an uplink resource and/or an uplink transmission parameter used by the first terminal device and/or the second terminal device to send the first data to the network device.

In an implementation, the receiver 1202 is configured to receive the first data from the first terminal device and/or the second terminal device.

In an implementation, the receiver 1202 is further configured to receive feedback information from the second terminal device, where the feedback information is used to indicate whether the second terminal device correctly receives the first data.

In an implementation, a format of the first downlink control information and a format of the second downlink control information are different.

In an implementation, the first downlink control information is scrambled by using a first identifier, and the second downlink control information is scrambled by using a second identifier.

In an implementation, the first downlink control information further includes first indication information, and the first indication information is used to indicate the first terminal device to send the first data to the second terminal device through a sidelink.

In an implementation, the second downlink control information further includes second indication information, and the second indication information is used to indicate the first terminal device and/or the second terminal device to send the first data to the network device through an uplink.

In an implementation, the second downlink control information further includes third indication information, and the third indication information indicates a transmission mode used by the second terminal device to send the first data to the network device.

In an implementation, the feedback information is used to indicate that the second terminal device correctly receives the first data; and the third indication information indicates a decode-and-forward transmission mode used by the second terminal device to send the first data to the network device.

In an implementation, the feedback information is used to indicate that the second terminal device does not correctly receive the first data; and the third indication information indicates an amplify-and-forward transmission mode or a give-up-forwarding transmission mode used by the second terminal device to send the first data to the network device.

FIG. 13 is a schematic diagram of a structure of a first terminal device or a combined part that can implement functions of the foregoing terminal device according to an embodiment. As shown in FIG. 13, the terminal device may be used in the system shown in FIG. 1 and perform functions of the first terminal device in the method embodiment shown in FIG. 2. For ease of description, FIG. 13 shows only main components of the first terminal device. As shown in FIG. 13, a first terminal device 1300 may include a receiver 1301 and a transmitter 1302. The receiver 1301 may also be referred to as a receiver machine, an input port, a receiving circuit, or the like. For example, a related function implemented by the receiving module 1001 shown in FIG. 10 may be implemented by the receiver 1301. The transmitter 1302 may also be referred to as a transmitter machine, a transmitter, a transmitter circuit, or the like. For example, a related function implemented by the sending module 1002 shown in FIG. 10 may be implemented by the transmitter 1302. Optionally, the receiver 1301 and the transmitter 1302 shown in FIG. 13 may also be considered as a transceiver. The transceiver may also be referred to as a transceiver machine, a transceiver apparatus, or the like, and may implement related functions of the receiving module 1001 and the sending module 1002 shown in FIG. 10.

The first terminal device 1300 may further include a processor 1303 configured to: process data received by the receiver 1301, or process data to be sent by the transmitter 1302. The processor 1303 may include one or more processors. For example, the processor 1303 may be one or more central processing units (CPU), one or more network processors (NP), one or more hardware chips, or any combination thereof. When the processor 1303 is one CPU, the CPU may be a single-core CPU, or may be a multi-core CPU.

The first terminal device 1300 may further include a memory 1304, and the memory 1304 is configured to store program code and the like. The memory 1304 may include a volatile memory, for example, a random access memory (RAM). The memory 1304 may also include a non-volatile memory, for example, a read-only memory (ROM), a flash memory, a hard disk drive (HDD), or a solid-state drive (SSD). The memory 1304 may further include a combination of the foregoing types of memories.

The receiver 1301 and the transmitter 1302 may be used to implement the data transmission method performed by the first terminal device in the embodiment shown in FIG. 2. The receiver 1301 is configured to receive first downlink control information from a network device, where the first downlink control information includes first transmission configuration information, the first transmission configuration information indicates a sidelink resource and/or a sidelink transmission parameter used by the first terminal device to send first data to a second terminal device, a destination receive end of the first data is the network device, and the first terminal device and the second terminal device belong to a same cooperation group. The transmitter 1302 is configured to send the first data to the second terminal device. The receiver 1301 is further configured to receive second downlink control information from the network device, where the second downlink control information includes second transmission configuration information, and the second transmission configuration information indicates an uplink resource and/or an uplink transmission parameter used by the first terminal device and/or the second terminal device to send the first data to the network device.

In an implementation, the transmitter 1302 is further configured to send the first data to the network device.

In an implementation, the first downlink control information further includes first indication information, and the first indication information is used to indicate the first terminal device to send the first data to the second terminal device through a sidelink.

In an implementation, the second downlink control information further includes second indication information, and the second indication information is used to indicate the first terminal device to send the first data to the network device through an uplink.

FIG. 14 is a schematic diagram of a structure of a second terminal device or a combined part that can implement functions of the foregoing terminal device according to an embodiment. As shown in FIG. 14, the terminal device may be used in the system shown in FIG. 1 and perform functions of the second terminal device in the method embodiment shown in FIG. 2. For ease of description, FIG. 14 shows only main components of the second terminal device. As shown in FIG. 14, a second terminal device 1400 may include a receiver 1401 and a transmitter 1402. The receiver 1401 may also be referred to as a receiver machine, an input port, a receiving circuit, or the like. For example, a related function implemented by the receiving module 1101 shown in FIG. 11 may be implemented by the receiver 1401. The transmitter 1402 may also be referred to as a transmitter machine, a transmitter, a transmitter circuit, or the like. For example, a related function implemented by the sending module 1102 shown in FIG. 11 may be implemented by the transmitter 1402. Optionally, the receiver 1401 and the transmitter 1402 shown in FIG. 14 may also be considered as a transceiver. The transceiver may also be referred to as a transceiver machine, a transceiver apparatus, or the like, and may implement related functions of the receiving module 1101 and the sending module 1102 shown in FIG. 11.

The second terminal device 1400 may further include a processor 1403 and a memory 1404. For specific descriptions, refer to descriptions of the processor 1303 and the memory 1304 in the embodiment shown in FIG. 13. Details are not described herein again.

The receiver 1401 and the transmitter 1402 may be used to implement the data transmission method performed by the second terminal device in the embodiment shown in FIG. 2. The receiver 1401 is configured to receive first downlink control information from a network device, where the first downlink control information includes first transmission configuration information, the first transmission configuration information indicates a sidelink resource and/or a sidelink transmission parameter used by a first terminal device to send first data to the second terminal device, a destination receive end of the first data is the network device, and the first terminal device and the second terminal device belong to a same cooperation group. The receiver 1401 is further configured to receive the first data from the first terminal device. The transmitter 1402 is configured to send feedback information to the network device, where the feedback information is used to indicate whether the second terminal device correctly receives the first data. The receiver 1401 is further configured to receive second downlink control information from the network device, where the second downlink control information includes second transmission configuration information, and the second transmission configuration information indicates an uplink resource and/or an uplink transmission parameter used by the first terminal device and/or the second terminal device to send the first data to the network device.

In an implementation, the second downlink control information further includes third indication information, and the third indication information indicates a transmission mode used by the second terminal device to send the first data to the network device.

In an implementation, the feedback information is used to indicate that the second terminal device correctly receives the first data; and the transmitter 1402 is further configured to send the first data to the network device by using a decode-and-forward transmission mode.

In an implementation, the feedback information is used to indicate that the second terminal device does not correctly receive the first data; and the transmitter 1402 is configured to send the first data to the network device by using an amplify-and-forward transmission mode; or the transmitter 1402 is configured to clear the first data from a buffer by using a give-up-forwarding transmission mode.

An embodiment further provides a computer-readable storage medium. The computer-readable storage medium includes a program or instructions. When the program is run or the instructions are run on a computer, the computer is enabled to perform the data transmission method performed by the network device in the foregoing method embodiments.

An embodiment further provides a computer-readable storage medium. The computer-readable storage medium includes a program or instructions. When the program is run or the instructions are run on a computer, the computer is enabled to perform the data transmission method performed by the first terminal device in the foregoing method embodiments.

An embodiment further provides a computer-readable storage medium. The computer-readable storage medium includes a program or instructions. When the program is run or the instructions are run on a computer, the computer is enabled to perform the data transmission method performed by the second terminal device in the foregoing method embodiments.

An embodiment further provides a communication apparatus. The communication apparatus includes a processor. The processor is configured to implement the data transmission method in any one of the foregoing method embodiments. The communication apparatus may be, for example, a chip system. In a feasible implementation, the communication apparatus further includes a memory. The memory is configured to store program instructions and data that are necessary for implementing a function of the network device.

An embodiment further provides a communication apparatus. The communication apparatus includes a processor. The processor is configured to implement the data transmission method in any one of the foregoing method embodiments. The communication apparatus may be, for example, a chip system. In a feasible implementation, the communication apparatus further includes a memory. The memory is configured to store program instructions and data that are necessary for implementing a function of the first terminal device.

An embodiment further provides a communication apparatus. The communication apparatus includes a processor. The processor is configured to implement the data transmission method in any one of the foregoing method embodiments. The communication apparatus may be, for example, a chip system. In a feasible implementation, the communication apparatus further includes a memory. The memory is configured to store program instructions and data that are necessary for implementing a function of the second terminal device.

All or some of the foregoing embodiments may be implemented by using software, hardware, firmware, or any combination thereof. When software is used to implement the foregoing embodiments, all or some of the foregoing embodiments may be implemented in a form of a computer program product. The computer program product includes one or more computer instructions. When the computer instructions are loaded and executed on a computer, all or some of the procedures or functions according to the embodiments are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a Digital Video Disc (DVD)), a semiconductor medium (for example, a Solid State Disk (SSD)), or the like.

A person of ordinary skill in the art may be aware that, in combination with the examples described in the embodiments, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on a particular application. A person skilled in the art may use different methods to implement the described functions for each particular application, but it should not be considered that the implementation goes beyond the scope of the embodiments.

The foregoing descriptions are merely implementations of embodiments, but are not intended as limiting. Any variation or replacement readily figured out by a person skilled in the art shall fall within the scope of the embodiments.

What is claimed is:

1. A data transmission method comprising:
   sending, by a network device, first downlink control information to a first terminal device and a second terminal device, wherein the first downlink control information comprises first transmission configuration information, the first transmission configuration information indicates a sidelink resource and/or a sidelink transmission parameter used by the first terminal device to send first data to the second terminal device, a destination receive end of the first data is the network device, and the first terminal device and the second terminal device belong to a same cooperation group; and
   sending, by the network device, second downlink control information to the first terminal device and the second terminal device, wherein the second downlink control information comprises second transmission configuration information, the second transmission configuration information indicates an uplink resource and/or an uplink transmission parameter used by the first terminal device and/or the second terminal device to send the first data to the network device, and the network device uses the second downlink control information to notify the first terminal device and the second terminal device of an identity of a transmission mode used by the second terminal device to send the first data to the network device.

2. The data transmission method according to claim 1, further comprising:
   receiving, by the network device, the first data from the first terminal device and/or the second terminal device.

3. The data transmission method according to claim 1, wherein before the sending, by the network device, of the second downlink control information to the first terminal device and the second terminal device, the data transmission method further comprises:
   receiving, by the network device, feedback information from the second terminal device, wherein the feedback information is used to indicate whether the second terminal device correctly receives the first data.

4. The data transmission method according to claim 3, wherein the second downlink control information further comprises third indication information, and the third indication information indicates the transmission mode used by the second terminal device to send the first data to the network device.

5. The data transmission method according to claim 4, wherein the feedback information is used to indicate that the second terminal device correctly receives the first data and the third indication information indicates a decode-and-forward transmission mode used by the second terminal device to send the first data to the network device.

6. The data transmission method according to claim 4, wherein the feedback information is used to indicate that the second terminal device does not correctly receive the first data and the third indication information indicates an amplify-and-forward transmission mode or a give-up-forwarding transmission mode used by the second terminal device to send the first data to the network device.

7. The data transmission method according to claim 1, wherein a format of the first downlink control information and a format of the second downlink control information are different.

8. The data transmission method according to claim 1, wherein the first downlink control information is scrambled by using a first identifier, and the second downlink control information is scrambled by using a second identifier.

9. The data transmission method according to claim 1, wherein the first downlink control information further comprises first indication information, and the first indication information is used to indicate the first terminal device to send the first data to the second terminal device through a sidelink.

10. The data transmission method according to claim 1, wherein the second downlink control information further comprises second indication information, and the second indication information is used to indicate the first terminal device and/or the second terminal device to send the first data to the network device through an uplink.

11. A data transmission method comprising:
receiving, by a first terminal device, first downlink control information from a network device, wherein the first downlink control information comprises first transmission configuration information, the first transmission configuration information indicates a sidelink resource and/or a sidelink transmission parameter used by the first terminal device to send first data to a second terminal device, a destination receive end of the first data is the network device, and the first terminal device and the second terminal device belong to a same cooperation group;
sending, by the first terminal device, the first data to the second terminal device; and
receiving, by the first terminal device, second downlink control information from the network device, wherein the second downlink control information comprises second transmission configuration information, the second transmission configuration information indicates an uplink resource and/or an uplink transmission parameter used by the first terminal device and/or the second terminal device to send the first data to the network device, and the network device uses the second downlink control information to notify the first terminal device and the second terminal device of an identity of a transmission mode used by the second terminal device to send the first data to the network device.

12. The data transmission method according to claim 11, further comprising:
sending, by the first terminal device, the first data to the network device.

13. The data transmission method according to claim 11, wherein the first downlink control information further comprises first indication information, and the first indication information is used to indicate the first terminal device to send the first data to the second terminal device through a sidelink.

14. The data transmission method according to claim 11, wherein the second downlink control information further comprises second indication information, and the second indication information is used to indicate the first terminal device to send the first data to the network device through an uplink.

15. A data transmission apparatus comprising:
a receiving module, configured to receive first downlink control information from a network device, wherein the first downlink control information comprises first transmission configuration information, the first transmission configuration information indicates a sidelink resource and/or a sidelink transmission parameter used by a first terminal device to send first data to a second terminal device, a destination receive end of the first data is the network device, and the first terminal device and the second terminal device belong to a same cooperation group, wherein
the receiving module is further configured to receive the first data from the first terminal device; and
a sending module, configured to send feedback information to the network device, wherein the feedback information is used to indicate whether the second terminal device correctly receives the first data, wherein
the receiving module is further configured to receive second downlink control information from the network device, wherein the second downlink control information comprises second transmission configuration information, the second transmission configuration information indicates an uplink resource and/or an uplink transmission parameter used by the first terminal device and/or the second terminal device to send the first data to the network device, and the network device uses the second downlink control information to notify the first terminal device and the second terminal device of an identity of a transmission mode used by the second terminal device to send the first data to the network device.

16. The data transmission apparatus according to claim 15, wherein the second downlink control information further comprises third indication information, and the third indication information indicates the transmission mode used by the second terminal device to send the first data to the network device.

17. The data transmission apparatus according to claim 15, wherein the feedback information is used to indicate that the second terminal device correctly receives the first data; and the sending module is further configured to send the first data to the network device by using a decode-and-forward transmission mode.

18. The data transmission apparatus according to claim 15, wherein the feedback information is used to indicate that the second terminal device does not correctly receive the first data; and the sending module is further configured to:
send the first data to the network device by using an amplify-and-forward transmission mode; or
clear the first data from a buffer by using a give-up-forwarding transmission mode.

* * * * *